United States Patent
Xu et al.

(10) Patent No.: US 12,328,278 B2
(45) Date of Patent: Jun. 10, 2025

(54) COMMUNICATION METHOD AND APPARATUS

(71) Applicant: HUAWEI TECHNOLOGIES CO., LTD., Guangdong (CN)

(72) Inventors: Zijie Xu, Shanghai (CN); Yu Gao, Shanghai (CN); Guohua Zhou, Shanghai (CN); Jinlin Peng, Shanghai (CN); Shengyue Dou, Shanghai (CN); Xueru Li, Beijing (CN); Xianda Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 17/886,453

(22) Filed: Aug. 11, 2022

(65) Prior Publication Data

US 2022/0393822 A1    Dec. 8, 2022

Related U.S. Application Data

(63) Continuation of application No. PCT/CN2021/076264, filed on Feb. 9, 2021.

(30) Foreign Application Priority Data

Feb. 13, 2020   (CN) .......................... 202010090531.X

(51) Int. Cl.
*H04W 72/12* (2023.01)
*H04L 5/00* (2006.01)
(Continued)

(52) U.S. Cl.
CPC ....... *H04L 5/0048* (2013.01); *H04W 72/1268* (2013.01); *H04W 72/23* (2023.01)

(58) Field of Classification Search
CPC .......................... H04W 72/1268; H04W 72/23
See application file for complete search history.

(56) References Cited

U.S. PATENT DOCUMENTS

| 10,601,558 | B2* | 3/2020 | Li ..................... H04W 74/0808 |
| 2014/0198763 | A1 | 7/2014 | Sorrentino et al. |
| 2014/0241284 | A1 | 8/2014 | Zhou |
| 2018/0227156 | A1* | 8/2018 | Papasakellariou .......................... H04L 27/2613 |

(Continued)

FOREIGN PATENT DOCUMENTS

| CN | 106921479 A | 7/2017 |
| CN | 107371241 A | 11/2017 |

(Continued)

OTHER PUBLICATIONS

Nokia, Nokia Shanghai Bell, Maintenance for reference signals and QCL. 3GPP TSG RAN WG1 Meeting #95, Spokane, WA, USA, Nov. 12-16, 2018, R1-1813487, 6 pages.

(Continued)

*Primary Examiner* — Fahmida S Chowdhury

(57) ABSTRACT

A communication method and apparatus improve accuracy of correcting a frequency offset. Configuration information received from a network device provides for configuring one or more uplink reference signal resources each including a first time unit and a second time unit. The first time unit includes a first antenna port. The second time unit includes a second antenna port. An uplink reference signal is sent to the network device based on the configuration information.

20 Claims, 12 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 2018/0331872 A1 | 11/2018 | Manolakos et al. | |
| 2019/0158348 A1* | 5/2019 | Liou | H04L 41/0816 |
| 2019/0173607 A1* | 6/2019 | Liu | H04L 5/0044 |
| 2019/0349066 A1* | 11/2019 | Yang | H04B 7/0697 |
| 2019/0356431 A1* | 11/2019 | Manolakos | H04L 5/005 |
| 2020/0007294 A1* | 1/2020 | Yang | H04L 5/0055 |
| 2020/0037385 A1* | 1/2020 | Park | H04W 76/19 |
| 2020/0112970 A1* | 4/2020 | Manolakos | H04L 5/0064 |
| 2020/0244503 A1* | 7/2020 | Bala | H04L 5/0007 |
| 2020/0252241 A1* | 8/2020 | Park | H04L 25/0224 |
| 2020/0305130 A1* | 9/2020 | Kang | H04L 5/0053 |
| 2021/0014012 A1* | 1/2021 | Park | H04L 5/00 |
| 2022/0006588 A1* | 1/2022 | Wang | H04W 72/0446 |
| 2022/0095144 A1* | 3/2022 | Ren | H04W 72/20 |
| 2022/0353039 A1* | 11/2022 | Okamura | H04W 52/146 |

FOREIGN PATENT DOCUMENTS

| | | | |
|---|---|---|---|
| CN | 109150467 A | | 1/2019 |
| CN | 110249599 A | | 9/2019 |
| CN | 110649949 A | | 1/2020 |
| EP | 3996436 A1 | | 5/2022 |
| WO | 2018204756 A1 | | 11/2018 |
| WO | 2018225935 A1 | | 12/2018 |

OTHER PUBLICATIONS

Ericsson, UL Reference Signals for NR Positioning. 3GPP TSG-RAN WG1 Meeting#98bis, Chongqing, P.R China, Oct. 14-20, 2019, R1-1911229, 10 pages.

3GPP TR 38.912 V1.0.0 (Mar. 2017), 3rd Generation Partnership Project; Technical Specification Group Radio Access Network; Study on New Radio (NR) Access Technology(Release 14), 74 pages.

3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15), 964 pages.

3GPP TSG RAN WG1 Meeting #85,R1-165041,Evaluations of DMRS Enhancement for PSCCH and PSSCH,Nokia, Alcatel-Lucent Shanghai Bell ,Nanjing, China May 23-27, 2016,total 11 pages.

* cited by examiner

COMMUNICATION METHOD AND APPARATUS

CROSS-REFERENCE TO RELATED APPLICATIONS

This application is a continuation of International Application No. PCT/CN2021/076264, filed on Feb. 9, 2021, which claims priority to Chinese Patent Application No. 202010090531.X, filed on Feb. 13, 2020. The disclosures of the aforementioned applications are hereby incorporated by reference in their entireties.

TECHNICAL FIELD

Embodiments relate to the field of communication technologies, and in particular, to a communication method and apparatus.

BACKGROUND

In a communication system, to improve the communication quality between a network device and a terminal device, the terminal device needs to perform frequency synchronization and frequency tracking, while the network device needs to perform frequency offset estimation and compensation.

How to enhance the accuracy of frequency offset estimation is a problem worthy of attention.

SUMMARY

Embodiments provide a communication method and apparatus, to improve accuracy of correcting a frequency offset.

Specific technical solutions provided in embodiments are as follows:

According to a first aspect, a communication method is provided. The method may be performed by a terminal device, a chip, a chip system, or a circuit in a terminal device. The method is implemented by performing the following steps: receiving configuration information from a network device, where the configuration information provides for configuring one or more uplink reference signal resources, the one or more uplink reference signal resources include a first time unit and a second time unit, and a first antenna port corresponding to the first time unit is the same as a second antenna port corresponding to the second time unit; and sending an uplink reference signal to the network device based on the configuration information. The first antenna port of the first time unit is the same as the second antenna port of the second time unit. In this way, the same antenna ports correspond to same channels and same frequency offsets, and the network device may perform frequency offset estimation based on the uplink reference signals received by the first antenna port and the second antenna port to improve accuracy of frequency offset estimation.

According to a second aspect, a communication method is provided. The method may be performed by a network device, or may be performed by a chip, a chip system, or a circuit in a network device. The method is implemented by performing the following steps: sending configuration information to a terminal device, where the configuration information provides for configuring one or more uplink reference signal resources, the one or more uplink reference signal resources include a first time unit and a second time unit, and a first antenna port corresponding to the first time unit is the same as a second antenna port corresponding to the second time unit; and receiving an uplink reference signal from the terminal device. The first antenna port of the first time unit is the same as the second antenna port of the second time unit. In this way, the same antenna ports correspond to same channels and same frequency offsets, and the network device may perform frequency offset estimation based on the uplink reference signals received by the first antenna port and the second antenna port to improve accuracy of frequency offset estimation.

According to a third aspect, a communication method is provided. The method may be performed by a network device, a chip, a chip system, or a circuit in a network device. The method is implemented by performing the following steps: determining downlink configuration information, where the downlink configuration information provides for configuring a resource of a downlink reference signal, and the downlink reference signal meets one or more of the following configurations: an interval between two adjacent time units occupied by the downlink reference signal in one slot is less than four symbols, or an interval between any two units occupied by the downlink reference signal in frequency domain is greater than four subcarriers; and sending the downlink configuration information to a terminal device. The interval between two adjacent units occupied by the downlink reference signal in one slot is less than four symbols, so that the downlink reference signal can have a smaller pattern in time domain, to adapt to estimation of a relatively large frequency offset. For example, a maximum Doppler frequency offset in a case in which a carrier frequency is 3.5 GHz, a rate is 350 km/h, and an SCS is 15 KHz exceeds a maximum estimation range of an existing tracking reference signal (TRS) with an interval of four symbols. By using this design, estimation of a larger Doppler frequency offset can be adapted. It is designed that an interval between any two units in frequency domain of the downlink signal is greater than four subcarriers, so that overheads of configuration notification by the network device can be reduced.

In a possible design, uplink configuration information is sent to the terminal device, where the uplink configuration information is for configuring one or more uplink reference signal resources, the one or more uplink reference signal resources include a first time unit and a second time unit, and a first antenna port corresponding to the first time unit is the same as a second antenna port corresponding to the second time unit.

According to a fourth aspect, a communication method is provided. The method may be performed by a terminal device, or may be performed by a chip, a chip system, or a circuit in a terminal device. The method is implemented by performing the following steps: receiving downlink configuration information from a network device, where the downlink configuration information is for configuring a downlink reference signal resource, and the downlink reference signal meets one or more of the following configurations: an interval between two adjacent time units occupied by the downlink reference signal in one slot is less than four symbols, or an interval between any two frequency domain units occupied by the downlink reference signal in frequency domain is greater than four subcarriers; and receiving the downlink reference signal from the network device based on the downlink configuration information. The interval between two adjacent time units occupied by the downlink reference signal in one slot is less than four symbols, so that the downlink reference signal can have a smaller pattern in time domain, to adapt to estimation of a relatively large frequency offset. For example, a maximum Doppler frequency offset in a case in which a carrier frequency is 3.5 GHz, a rate is 350 km/h, and an SCS is 15 KHz exceeds a maximum estimation range of an existing TRS with an interval of four symbols. By using this design, estimation of a larger Doppler frequency offset can be adapted. An interval between any two units occupied by a downlink signal in frequency domain is greater than four subcarriers so that configuration notification overhead of the network device can be reduced.

In a possible design, uplink configuration information is received from the network device, where the uplink configuration information provides for configuring one or more uplink reference signal resources, the one or more uplink reference signal resources include a first time unit and a second time unit, and a first antenna port corresponding to the first time unit is the same as a second antenna port corresponding to the second time unit.

With reference to the first aspect, the second aspect, the third aspect, and the fourth aspect, the following describes some possible designs of the first aspect to the fourth aspect.

In a possible design, the first time unit and the second time unit are two OFDM symbols in two adjacent slots. Configurable ranges of a first OFDM symbol and a second OFDM symbol are designed to be two slots so that more terminal devices can be supported through the uplink reference signal configuration.

In a possible design, a quantity of uplink reference signal ports corresponding to the first time unit is different from a quantity of uplink reference signal ports corresponding to the second time unit. In this way, a function of multiplexing the uplink reference signal resource can be used so that the uplink reference signal resource is multiplexed as much as possible, thereby saving uplink reference signal resources.

In a possible design, an uplink reference signal port number corresponding to the first time unit is the same as an uplink reference signal port number corresponding to the second time unit.

In a possible design, the first antenna port is associated with an uplink reference signal port corresponding to at least one first time unit, and the second antenna port is associated with an uplink reference signal port corresponding to at least one second time unit.

In a possible design, the first time unit and the second time unit are two OFDM symbols in a first slot, and the first time unit and the second time unit are any two non-adjacent symbols in the first slot. In this way, all symbols instead of the last six symbols in one slot can be used for the uplink reference signal configuration, so that more terminal devices can be supported through the uplink reference signal configuration.

In a possible design, a function of the one or more uplink reference signal resources is configured for frequency offset measurement, or configured for a codebook-based uplink transmission mode. The two uplink reference signal resources used for frequency offset estimation are limited to have a same uplink reference signal port and correspond to a same antenna port, to ensure accuracy of frequency offset estimation. In addition, the following enhancement may be further additionally performed: It is ensured that phases of a plurality of configured SRS resources are continuous with each other, thereby avoiding an error in frequency offset estimation at a receive end caused by different initial phases of sent SRSs. When a function of the one or more uplink reference signal resources is configured for a codebook-based uplink transmission mode, an existing configuration of the uplink reference signal resource may be directly reused, to reduce the uplink reference signal resources and ensure accuracy of frequency offset estimation.

In a possible design, the first time unit corresponds to a first uplink reference signal resource, the second time unit corresponds to a second uplink reference signal resource, and some or all antenna ports in the first uplink reference signal resource and the second uplink reference signal resource keep phase continuity. The terminal device may continuously enable a power amplifier configured to send the first uplink reference signal corresponding to the first time unit, until the power amplifier completes sending the second uplink reference signal corresponding to the second time unit. In this sending manner, the network device may perform frequency offset estimation on a signal that keeps phase continuity, to ensure frequency offset estimation performance.

In a possible design, when an uplink reference signal resource includes the first time unit and the second time unit, the first time unit and the second time unit are non-adjacent in time domain.

With reference to the first aspect and the second aspect, in a possible design, the method further includes: The network device sends a first downlink reference signal to the terminal device, and the terminal device receives the first downlink reference signal from the network device, where the first downlink reference signal meets one or more of the following configurations: an interval between two adjacent time units occupied by the first downlink reference signal in one slot is less than four symbols, or an interval between any two units occupied by the first downlink reference signal in frequency domain is greater than four subcarriers. The interval between any two time units occupied by the first downlink reference signal in one slot is less than four symbols, so that the first downlink reference signal can have a smaller pattern in time domain, to adapt to estimation of a relatively large frequency offset. For example, a maximum Doppler frequency offset in a case in which a carrier frequency is 3.5 GHz, a rate is 350 km/h, and an SCS is 15 KHz exceeds a maximum estimation range of an existing TRS with an interval of four symbols. By using this design, estimation of a larger Doppler frequency offset can be adapted. It is designed that the interval between any two frequency domain units occupied by the first downlink signal in frequency domain is greater than four subcarriers, so that overheads of configuration notification by the network device can be reduced.

Optionally, the first downlink reference signal is a TRS.

With reference to the first aspect, in a possible design, the method further includes: receiving a second downlink reference signal from the network device; and performing frequency offset compensation based on frequency offset estimation obtained based on the second downlink reference signal and carrier frequency estimation obtained based on the first downlink reference signal. In this way, a signal received by the receive end has no frequency offset or has a very small frequency offset. The carrier frequency estimation herein is a process of obtaining a carrier frequency of a received signal using a received reference signal.

Optionally, the second reference signal is a DMRS or an additional demodulation reference signal.

According to a fifth aspect, an embodiment provides a communication apparatus. The communication apparatus includes a communication interface and a processor. The communication interface is used by the apparatus to communicate with another device, for example, to send and receive data or signals. For example, the communication interface may be a transceiver, a circuit, a bus, a module, or a communication interface of another type, and the another device may be a network device or a node. The processor is configured to invoke a group of programs, instructions, or data to perform the method according to the first aspect or the fourth aspect. The apparatus may further include a memory, configured to store the programs, the instructions, or the data invoked by the processor. The memory is coupled to the processor. When executing the instructions or the data stored in the memory, the processor can implement the method described in the first aspect or the fourth aspect.

According to a sixth aspect, an embodiment provides a communication apparatus. The communication apparatus includes a communication interface and a processor. The communication interface is used by the apparatus to communicate with another (second) device, for example, to send and receive data or signals. For example, the communication interface may be a transceiver, a circuit, a bus, a module, or another type of communication interface, and the other (second) device may be a terminal device. The processor is configured to invoke a group of programs, instructions, or data to perform the method according to the second aspect or the third aspect. The apparatus may further include a memory, configured to store the programs, the instructions, or the data invoked by the processor. The memory is coupled to the processor. When executing the instructions or the data stored in the memory, the processor can implement the method according to the second aspect or the third aspect.

According to a seventh aspect, an embodiment further provides a computer-readable storage medium. The computer-readable storage medium stores computer-readable instructions. When the computer-readable instructions are run on a computer, the computer is enabled to perform the method according to the first aspect or the fourth aspect or the method in any one of the possible designs.

According to an eighth aspect, an embodiment further provides a computer-readable storage medium, including instructions. When the instructions are run on a computer, the computer is enabled to perform the method according to the second aspect or the third aspect or the method in any one of the possible designs in the second aspect or the third aspect.

According to a ninth aspect, an embodiment provides a chip system. The chip system includes a processor, and may further include a memory configured to implement the method according to the first aspect or the fourth aspect or the method in any one of the possible designs in the first aspect or the fourth aspect. The chip system may include a chip, or may include a chip and another discrete device.

According to a tenth aspect, an embodiment provides a chip system. The chip system includes a processor, and may further include a memory, configured to implement the method in any one of the possible designs in the second aspect or the third aspect. The chip system may include a chip, or may include a chip and another discrete device.

According to an eleventh aspect, an embodiment provides a communication system. The system includes a terminal device and a network device. The terminal device is configured to perform the method according to the first aspect or the fourth aspect or the method in any one of the possible designs in the first aspect or the fourth aspect. The network device is configured to perform the method according to the second aspect or the third aspect or the method in any one of the possible designs of the second aspect or the third aspect.

According to a twelfth aspect, a computer program product including instructions is provided. When the computer program product runs on a computer, the computer is enabled to perform the method according to any one of the foregoing aspects or the possible designs of the foregoing aspects.

DESCRIPTION OF EMBODIMENTS

Figure 1:
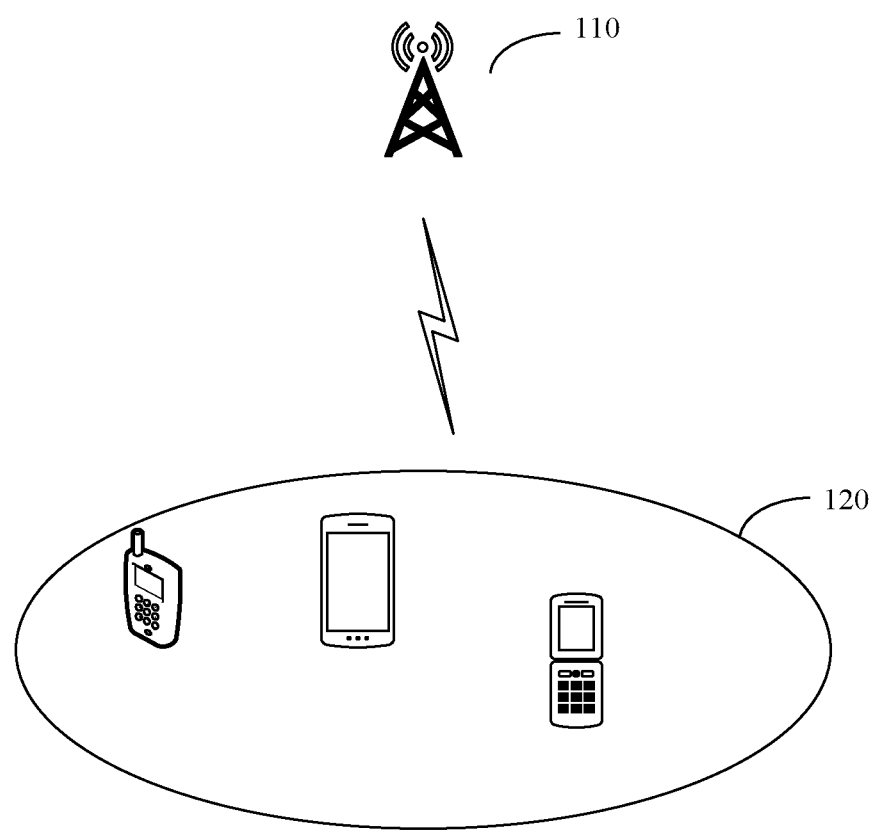
FIG. 1 is a schematic diagram of an architecture of a communication system according to an embodiment.

Embodiments provide a communication method and apparatus. The method and the apparatus are based on a same or similar concept of a same technology. Because the method and the apparatus have a similar problem-resolving principle, mutual reference may be made to implementation of the apparatus and the method. Repeated parts are not described in detail. In embodiments of this application, "at least one" means one or more. "A plurality of" means two or more than two. "And/or" describes an association relationship between associated objects, and indicates that three relationships may exist. For example, A and/or B may represent the following cases: Only A exists, both A and B exist, and only B exists. A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, or c may represent a, b, c, a and b, a and c, b and c, or a, b, and c, where each of a, b, and c may be an element, or may be a set including one or more elements.

In this specification, "example", "in some embodiments", "in some other embodiments", or the like is used to represent giving an example, an illustration, or a description. Any embodiment or design scheme described as "example" in this application should not be explained as being more preferred or having more advantages than another embodiment or design scheme. Specifically, the term "example" is used to present a concept in a specific manner.

In this specification, "of" and "corresponding may be interchangeably used sometimes. It should be noted that meanings expressed by the terms are consistent when differences are not emphasized. In embodiments of this application, communication and transmission may be interchangeably used sometimes. It should be noted that meanings expressed by the terms are consistent when differences are not emphasized. For example, transmission may include sending and/or receiving, and may be a noun or a verb.

It should be noted that, in embodiments of this application, terms such as "first" and "second" are only used for a purpose of distinction in description, but should not be understood as an indication or implication of relative importance or an indication or implication of a sequence.

The communication method provided in embodiments of this application may be applied to a 4th generation (4G) communication system, for example, a long term evolution (LTE) system; a 5th generation (5G) communication system, for example, a 5G new radio (NR) system; or various future communication systems, for example, a 6th generation (6G) communication system.

Optionally, embodiments of this application are applicable to a high-speed moving communication scenario, for example, a high-speed railway scenario. A terminal device in embodiments of this application may move at a high speed. High speed means that a moving speed is not less than a threshold. For example, the threshold may be 100 meters/second, 120 meters/second, 350 kilometers/hour, 500 kilometers/hour, or the like. The threshold may be predefined in a communication protocol, or may be determined by a terminal according to a preset algorithm or rule. This is not limited herein. For example, a specific form of the terminal device in the high-speed movement scenario may be an unmanned aerial vehicle (UAV), an on-board terminal, an airplane, a high-speed railway, an in-vehicle terminal, or the like. Specifically, the UAV may be understood as an aircraft that is remotely controlled by using a radio device or controlled and operated by using a built-in program.

Embodiments of this disclosure are applicable to a low frequency (for example, a frequency below 6 gigahertz (GHz)) scenario or a high frequency (for example, a frequency above 6 GHz) scenario.

FIG. 1 shows an architecture of a possible communication system to which a communication method according to an embodiment is applicable. The communication system may include a network device 110 and one or more terminal devices 120.

The network device 110 is a node in a radio access network (RAN), and may also be referred to as a base station, an access network device, or a node, or may also be referred to as a RAN node (or a device). Currently, some examples of the node 101 are: a next generation base station, e.g., next generation NodeB (gNB)), a next generation evolved base station (Ng-eNB), a transmission reception point (TRP), an evolved NodeB (eNB), a radio network controller (RNC), a node B (NB), a base station controller (BSC), a base transceiver station (BTS), a home base station (for example, a home evolved NodeB, or home Node B (HNB), a baseband unit (BBU), a wireless fidelity (Wi-Fi) access point (AP), a device in a 5G communication system, or a network device in a future possible communication system. The network device 110 may alternatively be a device that functions as a base station in device-to-device (D2D) communication. In this embodiment of this application, when the network device 110 communicates with the terminal device, there may be one or more network devices, and the network devices may locate in a same cell, or may locate in different cells.

The terminal device 120 may also be referred to as user equipment (UE), a mobile station (MS), a mobile terminal (MT), or the like, and is a device that provides a user with voice or data connectivity, or may be an Internet-of-Things device. For example, the terminal device 120 includes a handheld device, a vehicle-mounted device, or the like that has a wireless connection function. Currently, the terminal device 120 may be a mobile phone, a tablet computer, a notebook computer, a palmtop computer, a mobile internet device (MID), a wearable device (for example, a smartwatch, a smartband, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving (autonomous) vehicle, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. The terminal 120 may alternatively be a device that functions as a terminal in D2D communication.

Embodiments of this disclosure are applicable to scenarios in which there is one or more sending and receiving apparatuses, and a scenario derived from any one of the scenarios. The sending and receiving apparatus may be a transmission and reception point (TRP), or may be a remote radio unit (RRU), or the like. In a scenario in which there are a plurality of TRPs, the plurality of TRPs may be connected to a same baseband unit (BBU), or may be connected to different BBUs. The plurality of TRPs herein may belong to a same cell, or may belong to different cells.

In some application scenarios, for example, in a high-speed mobile communication scenario, the terminal device may communicate with a plurality of nodes. For example, in a multi-transmission and reception point (Multi-TRP) scenario, the terminal device may communicate with a plurality of TRPs. For example, the multi-TRP is implemented as a single frequency network cell (SFN cell) in 4G, and the multi-TRP is implemented as a hyper cell in 5G.

Embodiments of this application may be further applicable to scenarios derived from the various proposed application scenarios.

To improve communication quality between a network device and a terminal device, the terminal device needs to perform frequency synchronization and frequency tracking, while the network device needs to perform frequency offset estimation and compensation. The following uses two possible implementations in FIG. 2a and FIG. 2b as examples for description.

Figure 2A:
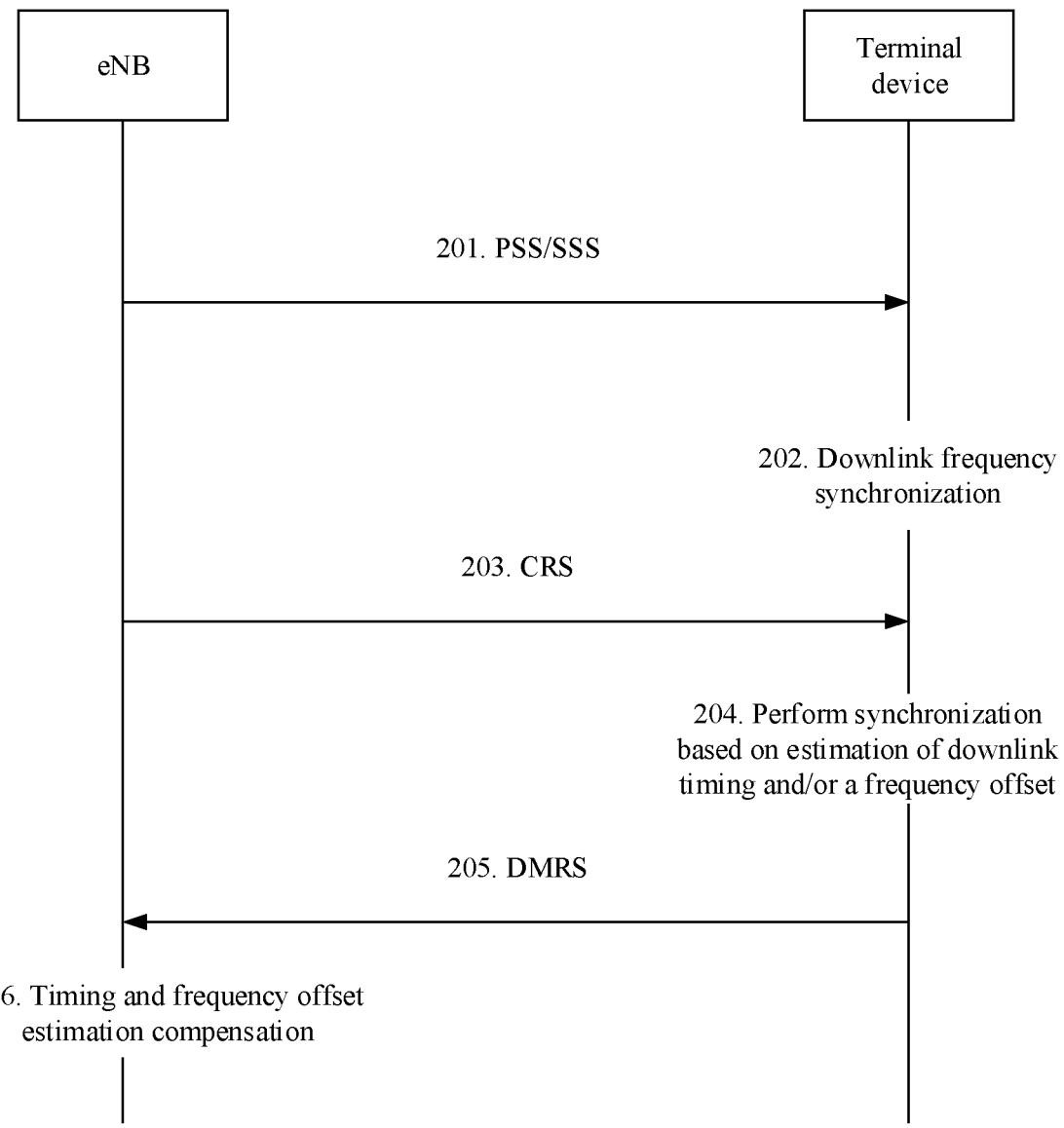
FIG. 2a is a schematic diagram of a time-frequency offset tracking method in LTE according to an embodiment.

As shown in FIG. 2a, a cell-reference signal (CRS) in an LTE system may be used for downlink time-frequency tracking. In other words, a terminal device may determine a downlink timing offset and a frequency offset based on a parameter of the CRS. Details are as follows:

S201. An eNB periodically sends cell synchronization signals, including a primary synchronization signal (PSS) and a secondary synchronization signal (SSS).

S202. The terminal device performs downlink frequency synchronization after receiving the PSS/SSS.

S203. The terminal device receives the CRSs sent by the eNB.

S204. The terminal device performs time frequency domain synchronization and/or time frequency tracking based on the estimation of downlink timing and/or the frequency offset.

S205. The terminal device sends uplink data and a demodulation reference signal (DMRS) on a physical uplink shared channel (PUSCH) on a tracked carrier frequency.

S206. The eNB performs timing and frequency offset estimation compensation by using the received DMRS.

Figure 2B:
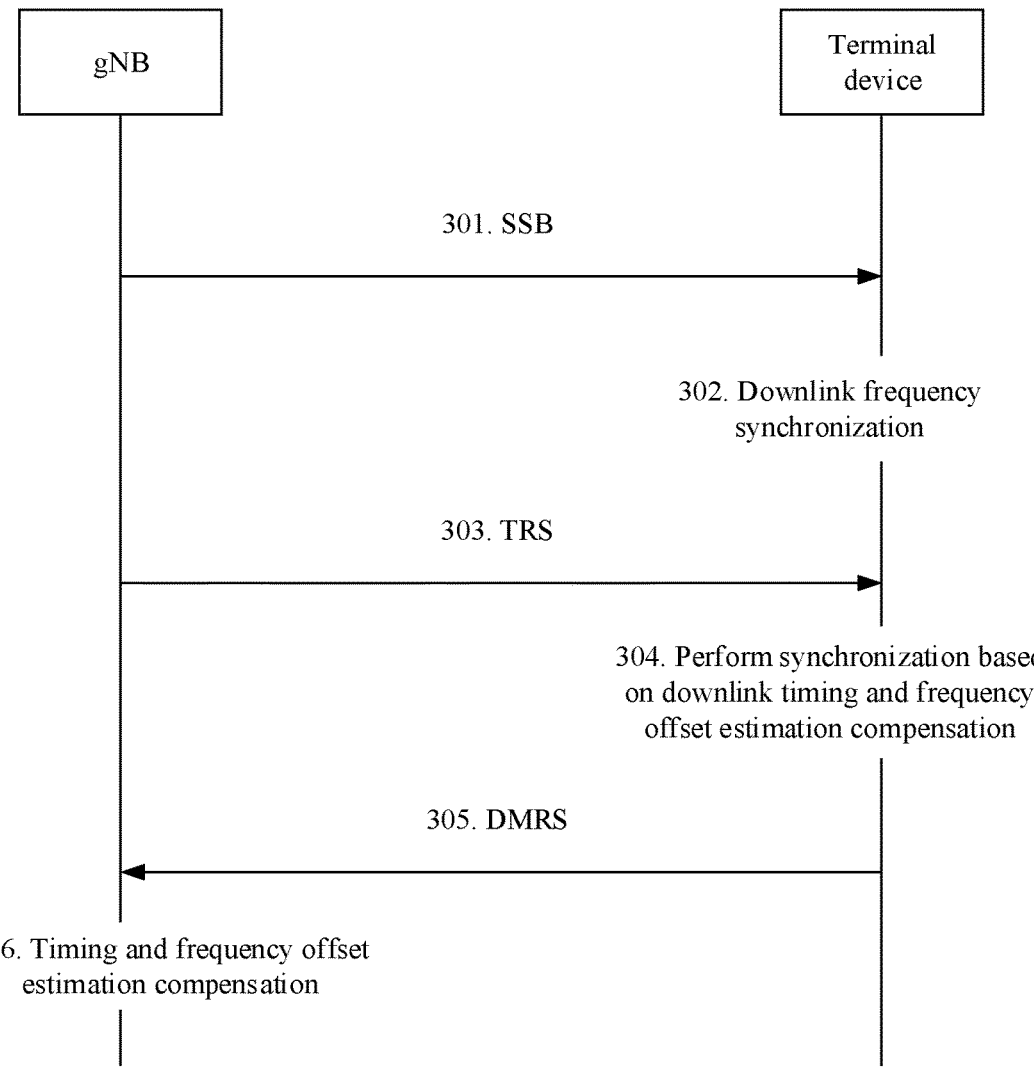
FIG. 2b is a schematic diagram of a time-frequency offset tracking method in NR according to an embodiment.

As shown in FIG. 2b, a TRS in an NR system may be used for downlink time-frequency tracking, to implement correct signal sending and receiving.

S301. A gNB periodically sends a cell synchronization signal SSB.

S302. A terminal device performs downlink frequency synchronization after receiving the SSB.

S303. The terminal device receives a TRS sent by the gNB.

S304. The terminal device performs synchronization based on estimation of downlink timing and a frequency offset.

S305. The terminal device sends uplink data and a demodulation reference signal DMRS on a PUSCH on a tracked carrier frequency.

S306. The gNB performs timing and frequency offset estimation compensation by using the received DMRS.

Although the method described in FIG. 2a or FIG. 2b can implement frequency synchronization and frequency offset estimation, accuracy of frequency offset estimation obtained by using the method is not high in some application scenarios. For example, in a high-speed movement scenario, a frequency offset is mostly a Doppler frequency offset, and the Doppler frequency offset is relatively large. In this case, a frequency tracked by the terminal device based on the CRS is inaccurate, resulting in a relatively large residual frequency offset. Such a large residual frequency offset causes severe inter-subcarrier interference (ICI). Especially when there are a large quantity of terminals, the severe multi-terminal interference greatly reduces reception performance of a receive end and reduces a system throughput. If the DMRS is used to perform frequency offset estimation compensation, the network device needs to schedule the DMRS in advance. If there are a large quantity of terminal devices, overheads of scheduling the DMRS by the network device are high, and complexity of the network device is high.

Based on this, the following provides some possible method designs in embodiments of this application.

Some terms in embodiments of this application are first described.

1. "Time unit" in embodiments of this application is a period of time in time domain. For example, the time unit may be a radio frame (radio frame), a subframe (subframe), a slot (slot), a micro-slot (micro-slot), a mini-slot (mini-slot), a symbol, or the like. This is not limited herein. The symbol may be an orthogonal frequency division multiplexing (OFDM) symbol.

2. In a term of TRS, when a CSI-RS resource set includes a trs-Info field, the CSI-RS resource set may be a TRS, and the trs-Info field indicates that the CSI-RS resource set is used for the TRS.

3. Frequency offset is frequency deviation. The frequency offset includes a carrier frequency offset (CFO) caused by an offset of a carrier frequency of a local oscillator of a transmit/receive end, and a Doppler shift caused by relative motion of the transmit/receive end. In a high-speed movement scenario, a Doppler shift is a main component of a frequency offset.

When a terminal device moves along a direction at a constant rate, a phase and a frequency of a received signal change due to a propagation path difference, and this change is usually referred to as a Doppler shift. In other words, a difference that is between a transmit frequency and a receive frequency and that is caused by a Doppler effect is referred to as a Doppler shift, which reveals the regularity of changes in attributes of a wave in motion.

4. Frequency offset estimation may also be described as frequency offset measurement, and refers to estimation of a frequency offset value between a carrier frequency of a received signal and a carrier frequency of a transmitted signal corresponding to the received signal.

Figure 3:
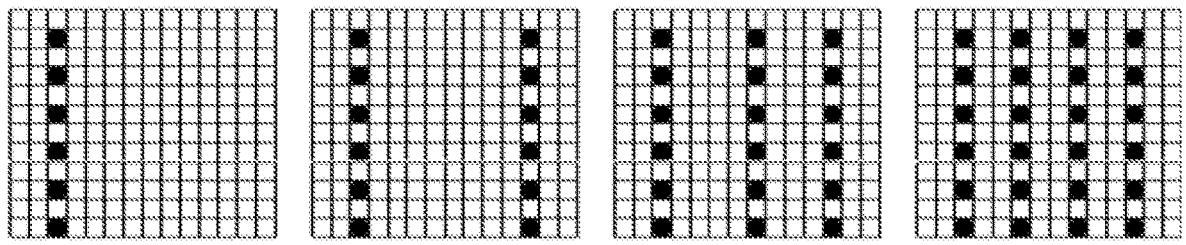
FIG. 3 is a schematic diagram of symbols occupied by additional DMRSs according to an embodiment.

5. Additional DMRS: Uplink DMRS is enhanced in NR, and an additional DMRS with a higher time domain density is introduced. Generally, before receiving a PDSCH or a PUSCH, a receive end needs to perform channel estimation based on a DMRS. The DMRS is sent on a start OFDM symbol of the PDSCH or the PUSCH, so that the receive end can quickly obtain a channel estimation result for data demodulation. To improve channel estimation performance, the DMRS is not only sent on the start OFDM symbol of the PDSCH or the PUSCH, but also sent on another OFDM symbol of the PDSCH or the PUSCH, and a DMRS sent on the another OFDM symbol is an additional DMRS. The additional DMRS may occupy one, two, or three OFDM symbols. As shown in FIG. 3, a large block in the figure represents one resource block (resource block, RB) in frequency domain and one slot in time domain, including 12 subcarriers (as shown in a vertical axis direction in the figure) and 14 OFDM symbols (as shown in a horizontal axis direction in the figure) in frequency domain. The leftmost RB in FIG. 3 is a single-symbol DMRS structure in which no additional DMRS is configured, and the third OFDM symbol (which is in the third column in the RB) is a DMRS symbol. The second RB from the left in FIG. 3 represents a single-symbol DMRS structure in which one additional DMRS is configured, and the additional DMRS is located on the twelfth OFDM symbol (which is in the twelfth column in the RB). The third RB from the left in FIG. 3 represents a single-symbol DMRS structure in which two additional DMRSs are configured, and the additional DMRSs are located on the eighth and twelfth OFDM symbols (which are in the eighth and twelfth columns in the RB). The fourth RB from the left in FIG. 3 represents a single-symbol DMRS structure in which three additional DMRSs are configured, and the additional DMRSs are located on the sixth, ninth, and twelfth OFDM symbols (which are in the sixth, ninth, and twelfth columns in the RB).

6. One time unit may correspond to one or more antenna ports in embodiments of this application. In other words, in the time unit, a transmit end sends a signal through the one or more antenna ports.

One time unit may correspond to one or more uplink reference signal ports. To be specific, the one or more uplink reference signal ports occupy the time unit, and the transmit end sends a signal in the time unit through the one or more uplink reference signal ports.

The antenna port is a physical antenna or a physical antenna element used by a transmit end to send a signal, or is formed by virtualization of a plurality of physical antennas. The reference signal port is a network side physical resource used to send a reference signal. The reference signal port may correspond to a physical time-frequency resource, a code domain resource, and/or a spatial beam.

Different uplink reference signal ports in a same uplink reference signal resource correspond to different antenna ports, and same uplink reference signal ports in different uplink reference signal resources correspond to different antenna ports.

The uplink reference signal may be an SRS, and the time unit may be a symbol. One symbol may correspond to one or more SRS ports, and one symbol may correspond to one or more antenna ports. Different SRS ports in a same SRS resource correspond to different antenna ports; and same SRS ports in different SRS resources correspond to different antenna ports.

Several possible examples of an association relationship between an SRS port and an antenna port are shown in Table 1 to Table 3. In Table 1 to Table 3, there is an association relationship between an SRS port and an antenna port in a row. For example, an SRS port 0 in an SRS resource 1 in Table 1 is associated with an antenna port 0, that is, there is an association relationship between an SRS port and an antenna port listed in each row of 1 Table to Table 3.

TABLE 1

| SRS port | Antenna port |
| --- | --- |
| SRS port 0 in an SRS resource 1 | Antenna port 0 |
| SRS port 0 in an SRS resource 2 | Antenna port 1 |

TABLE 2

| SRS port | Antenna port |
| --- | --- |
| SRS port 0 in an SRS resource 1 | Antenna port 0 |
| SRS port 0 in an SRS resource 2 | Antenna port 1 |
| SRS port 0 in an SRS resource 3 | Antenna port 2 |
| SRS port 0 in an SRS resource 4 | Antenna port 3 |

TABLE 3

| SRS port | Antenna port |
| --- | --- |
| SRS port 0 in an SRS resource 1 | Antenna port 0 |
| SRS port 1 in an SRS resource 1 | Antenna port 1 |
| SRS port 0 in an SRS resource 2 | Antenna port 2 |
| SRS port 1 in an SRS resource 2 | Antenna port 3 |

Figure 4:
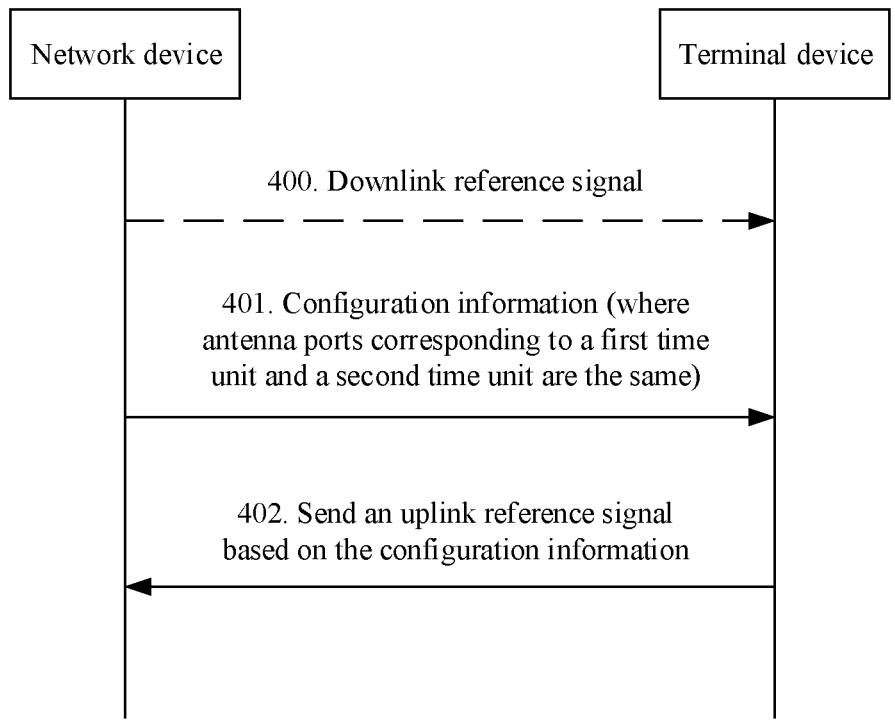
FIG. 4 is a schematic flowchart of a first communication method according to an embodiment.

As shown in FIG. 4, the following describes a first communication method according to an embodiment of this application.

S401. A network device sends uplink configuration information to a terminal device, and the terminal device receives the uplink configuration information from the network device.

The uplink configuration information is for configuring one or more uplink reference signal resources. The uplink reference signal resource may include any one or more resources in time domain, frequency domain, or code domain of an uplink reference signal.

The one or more uplink reference signal resources include a first time unit and a second time unit. In other words, the uplink reference signal resource occupies the first time unit and the second time unit in time domain. The first time unit and the second time unit may be considered as one or more adjacent OFDM symbols of the uplink reference signal resource in time domain. There may be one or more uplink reference signal resources. If there is one uplink reference signal resource, the uplink reference signal resource includes the first time unit and the second time unit, that is, one uplink reference signal occupies the first time unit and the second time unit. If there are a plurality of uplink reference signal resources, the first time unit and the second time unit may be included in different uplink reference signal resources. For example, a first uplink reference signal resource includes the first time unit, and a second uplink reference signal resource includes the second time unit.

Optionally, if the first time unit and the second time unit are included in a same uplink reference signal resource, the first time unit and the second time unit may be non-adjacent in time domain.

The first time unit corresponds to a first antenna port (antenna port), and the second time unit corresponds to a second antenna port. The first antenna port is the same as the second antenna port.

Optionally, both the first time unit and the second time unit may correspond to one or more antenna ports. For example, in addition to the first antenna port, the first time unit further corresponds to a third antenna port, and the third antenna port is different from both the first antenna port and the second antenna port. That a time unit corresponds to an antenna port may be understood as that a transmit end sends, in the time unit, a signal through the antenna port.

In a possible design, the first time unit corresponds to a first uplink reference signal resource, the second time unit corresponds to the first uplink reference signal resource, and one or more reference signal resource ports with a same number in the first uplink reference signal resource correspond to same antenna ports. That a time unit corresponds to a reference signal resource or a reference signal resource port may be understood as that the reference signal resource or the reference signal resource port occupies the time unit.

In a possible design, the first time unit corresponds to a first uplink reference signal resource, the second time unit corresponds to a second uplink reference signal resource, and one or more reference signal resource ports with a same number in the first uplink reference signal resource and the second uplink reference signal resource correspond to same antenna ports.

In a possible design, the first time unit corresponds to a first uplink reference signal resource, the second time unit corresponds to a second uplink reference signal resource, and some or all antenna ports in the first uplink reference signal resource and the second uplink reference signal resource keep phase continuity. Specifically, the terminal device may continuously enable a power amplifier configured to send the first uplink reference signal corresponding to the first time unit, until the power amplifier completes sending the second uplink reference signal corresponding to the second time unit. In this sending manner, the network device may perform frequency offset estimation on a signal that keeps phase continuity, to ensure frequency offset estimation performance.

Optionally, the uplink reference signal is an SRS.

S402. The terminal device sends the uplink reference signal to the network device based on the uplink configuration information. The network device receives the uplink reference signal from the terminal device.

The terminal device determines one or more uplink reference signal resources based on the configuration information. The one or more uplink reference signal resources include the first time unit and the second time unit. The terminal device sends the uplink reference signal in the first time unit and the second time unit through same antenna ports.

Because the same antenna ports correspond to same channels and same frequency offsets, it is designed that the first antenna port in the first time unit is the same as the second antenna port in the second time unit, and two uplink reference signals received by the network device from the terminal device are transmitted through the same channels and the same frequency offsets. In this way, the network device can perform frequency offset estimation based on the uplink reference signals received by the first antenna port and the second antenna port, to improve accuracy of frequency offset estimation.

Optionally, before S401 or S402, the method further includes S400.

S400. The network device sends a downlink reference signal to the terminal device. The terminal device receives the downlink reference signal from the network device.

For example, the downlink reference signal may be a TRS or a CRS.

The terminal device may obtain a downlink carrier frequency based on the downlink reference signal from the network device, and the downlink carrier frequency is used as a carrier reference for sending the uplink reference signal in S402. For example, the terminal device may adjust a center frequency based on the downlink carrier frequency, and send the uplink reference signal.

The following describes some possible designs of the uplink configuration information.

The uplink configuration information may be radio resource control (radio resource control, RRC) signaling, a media access layer control-control element (media access control-control element, MAC CE), or downlink control information (downlink control information, DCI).

The uplink configuration information may be further used for triggering transmission of an uplink reference signal. When receiving the uplink configuration information, the terminal device triggers transmission of the uplink reference signal.

The uplink reference signal may be a sounding reference signal (sounding reference signal, SRS), a demodulation reference signal (demodulation reference symbol, DMRS), an additional DMRS (additional DMRS), a phase tracking reference signal (PTRS), or a combination of any plurality of the foregoing reference signals.

The uplink reference signal may be used to estimate or measure an uplink frequency offset.

The following uses an example in which the uplink reference signal sent by the terminal device in S402 is an SRS for description.

If the uplink reference signal is an SRS, the SRS may be periodically transmitted. The uplink configuration information may be RRC signaling, where the RRC signaling is used to configure the periodically transmitted SRS. The SRS may be semi-persistently transmitted. The uplink configuration information may be RRC signaling and/or a MAC CE. An aperiodically transmitted SRS or a semi-persistently transmitted SRS may be configured using the RRC signaling, and the aperiodic transmission or the semi-persistent transmission is activated using the MAC CE. The SRS may be aperiodically transmitted, and the uplink configuration information may be RRC signaling. The aperiodically transmitted SRS may be configured using the RRC signaling, and the aperiodic transmission is triggered using the DCI.

The one or more uplink reference signal resources configured by the uplink configuration information may include two or more time units, and at least two of the time units correspond to same antenna ports. For example, the one or more uplink reference signal resources include four time units, where two of the four time units correspond to same antenna ports, or all the four time units correspond to same antenna ports.

The first time unit and the second time unit may be any two time units included in the one or more uplink reference signal resources.

Alternatively, a time unit may correspond to an uplink reference signal port. For example, the first time unit corresponds to a first uplink reference signal port, and the second time unit corresponds to a second uplink reference signal port. In this embodiment of this application, it may be designed that the first uplink reference signal port and the second uplink reference signal port are the same. The solution in this embodiment of this application may be further applicable to a scenario in which a quantity of first uplink reference signal ports is different from a quantity of second uplink reference signal ports. To be specific, a quantity of uplink reference signal ports corresponding to the first time unit is different from a quantity of uplink reference signal ports corresponding to the second time unit. Certainly, the quantity of first uplink reference signal ports may be the same as the quantity of second uplink reference signal ports.

The uplink reference signal resource configured by the uplink configuration information may be for frequency offset measurement, and the network device performs frequency offset measurement based on the uplink reference signal sent by the terminal device.

A function (usage) of the uplink reference signal resource may be set as a newly defined function, for example, defined as frequency offset measurement. The uplink configuration information includes the function of the uplink reference signal resource. After receiving the uplink configuration information, the terminal device determines, based on the function, that the uplink reference signal resource is for frequency offset measurement.

Alternatively, a function of the uplink reference signal resource configured by the uplink configuration information is used for a codebook (codebook)-based uplink transmission mode. The uplink reference signal resource used for a codebook is set, for example, the uplink reference signal resource is set to occupy a plurality of non-adjacent OFDM symbols, or an association relationship between antenna ports of a plurality of uplink reference signal resources is set, so that the uplink reference signal resource can be used for frequency offset measurement. The terminal device sends the uplink reference signal to the network device based on the uplink configuration information. The network device may perform frequency offset estimation based on the received uplink reference signal. Because the uplink reference signal resource is set as described above, the same antenna port corresponds to the same channel and the same frequency offset, two or more time units correspond to same antenna ports, and two or more uplink reference signals received by the network device from the terminal device are transmitted through same channels and affected by same frequency offsets, the network device may extract frequency offset information based on signals that are sent at different moments by using a same phase and a same power, and then perform difference processing, to obtain a more accurate frequency offset estimation result.

An example in which the uplink reference signal is an SRS and the time unit is a symbol is used to describe some possible designs of the configuration of the uplink reference signal resource in this embodiment of this application. In the following descriptions, descriptions of the SRS may be extended to descriptions of any uplink reference signal, and descriptions of the symbol may be extended to descriptions of any time unit.

The first time unit is a first symbol, and the second time unit is a second symbol. The uplink configuration information is for configuring one or more SRS resources. One SRS resource includes a first symbol and a second symbol, or a plurality of SRS resources include a first symbol and a second symbol. A first antenna port corresponding to the first symbol is the same as a second antenna port corresponding to the second symbol. If the first symbol and the second symbol are configured in one SRS resource, the first symbol and the second symbol are non-adjacent in time domain.

Generally, when configuring an SRS resource, the network device usually configures an SRS resource set. The SRS resource set may include one or more SRS resources. One SRS resource may include one or more symbols.

A first configuration manner of the uplink reference signal resource is as follows:

A function of the SRS resource or the SRS resource set may be a newly defined function, for example, may be defined as frequency offset measurement.

Figure 5A:
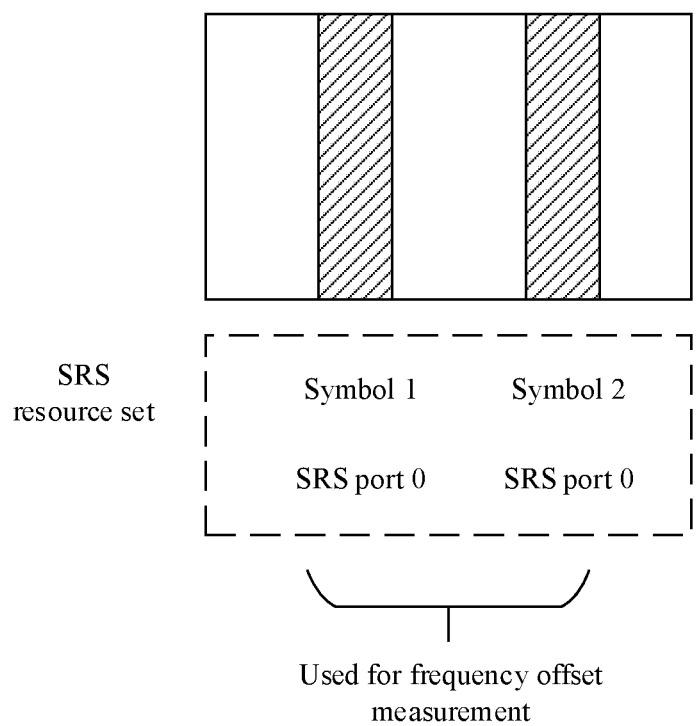
FIG. 5a is a first schematic diagram of a configuration manner of an uplink reference signal resource according to an embodiment.

As shown in FIG. 5a, it is assumed that the SRS resource set includes a first symbol (symbol 1) and a second symbol, and the symbol 1 and the symbol 2 each have an SRS port (SRS port). It is assumed that the SRS port is an SRS port 0. In this case, the symbol 1 and the symbol 2 have same antenna ports. The same antenna ports correspond to same channels and affected by same frequency offsets.

In this way, two SRS signals sent on the symbol 1 and the symbol 2 by the terminal device are transmitted through the same channels and affected by the same frequency offsets. The network device performs frequency offset estimation by using a phase difference between the symbol 1 and the symbol 2, so that a more accurate frequency offset estimation result can be obtained.

A second configuration manner of the uplink reference signal resource is as follows:

The SRS resource or the SRS resource set may also multiplex an existing function, for example, the function is a codebook-based uplink transmission mode. A basic principle of the codebook-based uplink transmission mode is as follows: A terminal device sends signals on a plurality of SRS ports. A base station determines and indicates precoding for a PUSCH based on the signals on the plurality of SRS ports, where the precoding for a PUSCH may be quantized as a precoding indicator (TPMI). The terminal device applies the TPMI on an antenna port corresponding to an SRS port, to send a physical uplink shared channel (PUSCH). In this function, the base station may obtain a channel on each antenna port on the terminal side by using signals on a plurality of SRS ports. If an SRS resource used for a frequency offset measurement function and an SRS resource used for a codebook function are independently configured, the SRS used for frequency offset measurement and the SRS used for a codebook need to be orthogonally multiplexed, so that a same SRS port and a same antenna port are set for the SRS used for frequency offset measurement.

In this embodiment of this application, in a possible design, a quantity of reference signal ports included in the first uplink reference signal resource corresponding to the first time unit may be set to be different from a quantity of reference signal ports included in the second uplink reference signal resource corresponding to the second time unit. Correspondingly, a quantity of SRS ports corresponding to the first symbol (the symbol 1) may be set to be different from a quantity of SRS ports corresponding to the second symbol (the symbol 2).

Figure 5B:
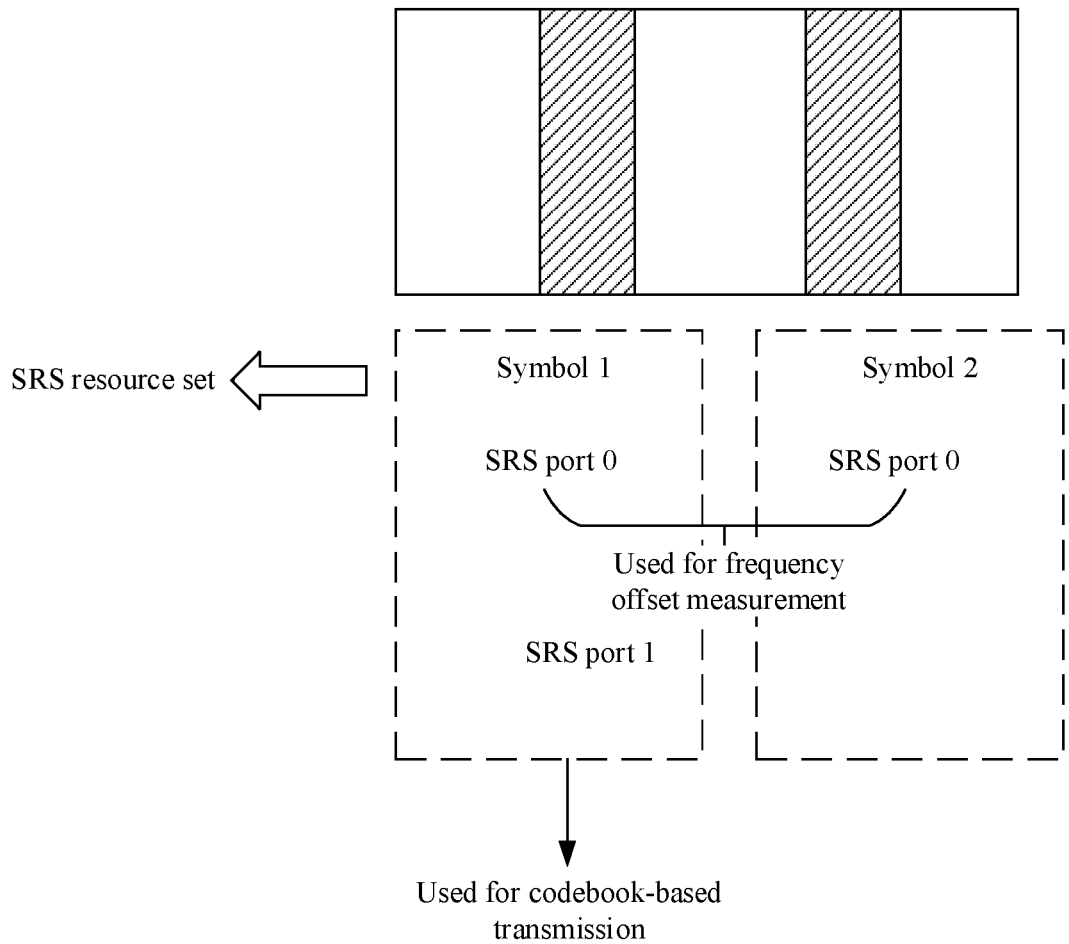
FIG. 5b is a second schematic diagram of a configuration manner of an uplink reference signal resource according to an embodiment.

For example, as shown in FIG. 5b, a symbol 1 corresponds to two SRS ports: an SRS port 0 and an SRS port 1. A symbol 2 corresponds to one SRS port: an SRS port 0. The SRS port 0 and the SRS port 1 of the symbol 1 may be used for a codebook. The SRS port 0 of the symbol 1 and the SRS port 0 of the symbol 2 may be used for frequency offset measurement. An antenna port corresponding to the SRS port 0 of the symbol 1 is set to be the same as an antenna port corresponding to the SRS port 0 of the symbol 2. For a 2Tx terminal device, that is, for a terminal device having two transmit antennas, such a configuration enables a 2-port SRS resource in the SRS resource set to be completely multiplexed with a 2-port SRS resource in an SRS resource set used for "codebook-based uplink transmission", to reduce overheads of the SRS resource.

In this way, two SRS signals sent on the symbol 1 and the symbol 2 by the terminal device are transmitted through same channels and affected by same frequency offsets. The network device performs frequency offset estimation by using a phase difference between the symbol 1 and the symbol 2, so that a more accurate frequency offset estimation result can be obtained. In addition, different quantities of SRS ports of different symbols in the SRS resource are set, so that a function of multiplexing the SRS resource can be used, and the SRS resource is multiplexed as much as possible, to save SRS resources.

Figure 5C:
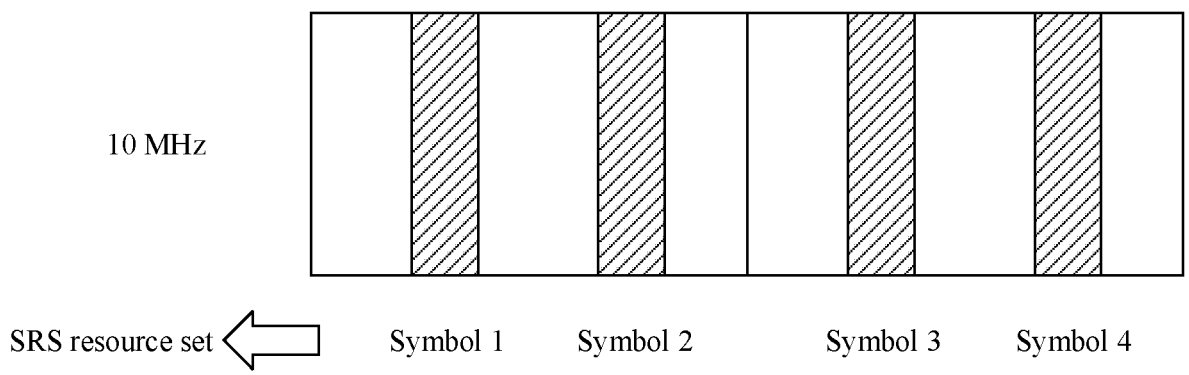
FIG. 5c is a third schematic diagram of a configuration manner of an uplink reference signal resource according to an embodiment.

An existing mechanism can be reused by time-frequency resource configurations of a plurality of SRS resources in the SRS resource set. For example, a time domain configuration form of a plurality of SRS resources in an SRS resource set is shown in FIG. 5c. Optional OFDM symbol locations used for SRS resource configuration in one slot are the eighth symbol and the twelfth symbol in one slot, or the ninth symbol and the thirteenth symbol in one slot, where symbols in one slot are numbered starting from 0. A bandwidth of the SRS resource is 10 MHz. In this configuration manner, the network device is enabled to perform precise frequency offset estimation based on an uplink signal, for example, Doppler shift (Doppler shift) estimation; and is used for downlink Doppler shift pre-compensation. All SRS resources in the SRS resource set may be configured to be periodic. For example, in FIG. 5c, a symbol 1 and a symbol 2 are in a same slot, and a symbol 3 and a symbol 4 are in another adjacent slot. A periodicity and offset of the symbol 1 and the symbol 2 are respectively 5 ms and 1 ms. A periodicity and offset of the symbol 3 and the symbol 4 are respectively 5 ms and 2 ms. The offset refers to a specific time unit in which an SRS resource is located in a periodicity. For example, if the offset is 1 ms, it indicates that a reference signal occupies the second ms in a periodicity of 5 ms. Alternatively, all SRS resources in the SRS resource set may be configured to be aperiodic. A triggering mechanism of an aperiodic SRS may be that one piece of DCI triggers sending of one or more SRS resource sets. In addition, there is a unified time offset for a sending moment of the SRS resource set relative to the DCI that triggers the SRS resource set. This manner cannot support the frequency offset measurement mechanism based on a plurality of slots shown in FIG. 5c. There may be a plurality of methods to resolve the foregoing problem. For example, in a first method, two new SRS resource sets are defined, and one time offset is independently configured for each set. In FIG. 5c, a symbol 1 and a symbol 2 are configured in the first SRS resource set, and a symbol 3 and a symbol 4 are configured in the second SRS resource set. In a second method, one SRS resource set is defined, and a time offset is independently configured for each SRS resource.

In an optional implementation, if it is agreed that all SRS resources in the SRS resource set have a same quantity of ports, it is stipulated that antenna ports corresponding to the SRS ports with a same port number in each resource are the same. The setting may be configured in the SRS resource set using RRC signaling, or may be configured in an SRS resource configuration that requires the restrictive relationship.

In another optional implementation, it is agreed that a quantity of ports of each SRS resource in the SRS resource set may be different. In this case, it is stipulated that antenna ports of SRS ports with a number of 0 in at least two different SRS resources are the same. The setting may be configured in the SRS resource set using RRC signaling, or may be configured in an SRS resource configuration that requires the restrictive relationship.

In this embodiment of this application, the first time unit and the second time unit may be in a same slot, or may be in different slots. In other words, both the first symbol and the second symbol are in a first slot, or the first symbol is in a first slot, and the second symbol is in a second slot. Optionally, the first slot and the second slot are two adjacent slots. In a possible design, the first time unit is one or more adjacent OFDM symbols in a slot. The second time unit is one or more adjacent OFDM symbols in a same slot, and is separated from the first time unit by K OFDM symbols, where K may be any integer from 1 to 12. In a possible design, the first time unit is one or more adjacent OFDM symbols in a slot 1, and the second time unit is one or more adjacent OFDM symbols in a slot 2 adjacent to the slot 1 in time domain.

If the first symbol and the second symbol are in a same slot, the first symbol and the second symbol may be symbols that are not limited to the last six symbols in the slot. In other words, in addition to a configurable range of the last six symbols in a slot, the first symbol and the second symbol may alternatively be configured in other symbols than the last six symbols.

Optionally, the first symbol and the second symbol may be any two non-adjacent symbols in one slot, that is, the configurable range of the first symbol and the second symbol is the entire slot.

Figure 6A:
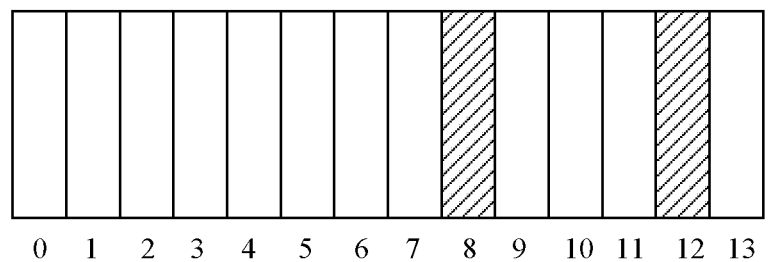
FIG. 6a is a first schematic diagram of a time domain configuration manner of an uplink reference signal resource according to an embodiment.
Figure 6B:
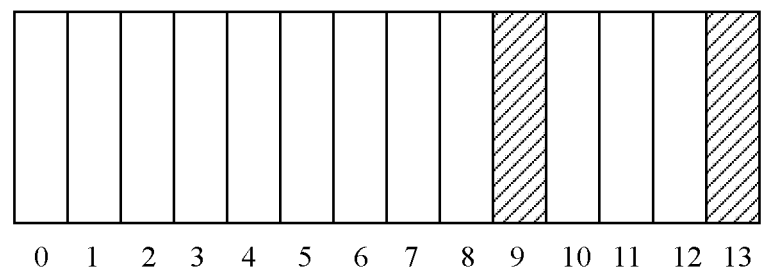
FIG. 6b is a second schematic diagram of a time domain configuration manner of an uplink reference signal resource according to an embodiment.

For example, the first slot includes 14 symbols, which are represented by numbers 0 to 13. The first symbol and the second symbol may be separated by three symbols. As shown in FIG. 6a, the first symbol and the second symbol may be the eighth symbol and the twelfth symbol in the first slot. Alternatively, as shown in FIG. 6b, the first symbol and the second symbol may be the ninth symbol and the thirteenth symbol in the first slot.

The configurable ranges of the first symbol and the second symbol are designed to be any symbols in a slot, so that more terminal devices can be supported through an uplink reference signal configuration.

Figure 6C:
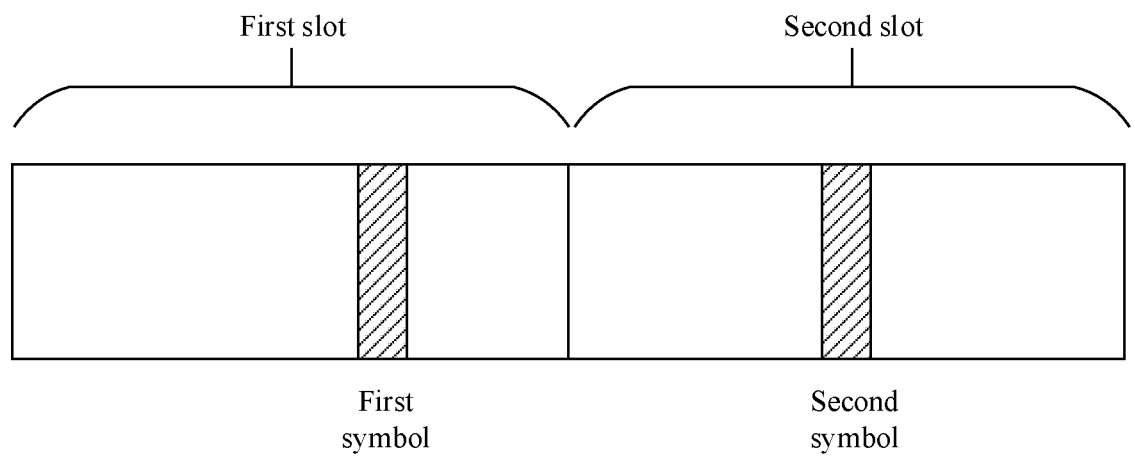
FIG. 6c is a third schematic diagram of a time domain configuration manner of an uplink reference signal resource according to an embodiment.

If the first symbol and the second symbol are in two adjacent slots, as shown in FIG. 6c, the first symbol is in a first slot, and the second symbol is in a second slot. Whether a location of the first symbol in the first slot is the same as a location of the second symbol in the second slot is not limited. For example, it may be specified that the first symbol is configured in a range of the last six symbols in the first slot, and the second symbol is configured in a range of the last six symbols in the second slot. Certainly, it may alternatively be specified that the first symbol is configured on another symbol in the first slot, and the second symbol is configured on another symbol in the second slot.

Figure 7:
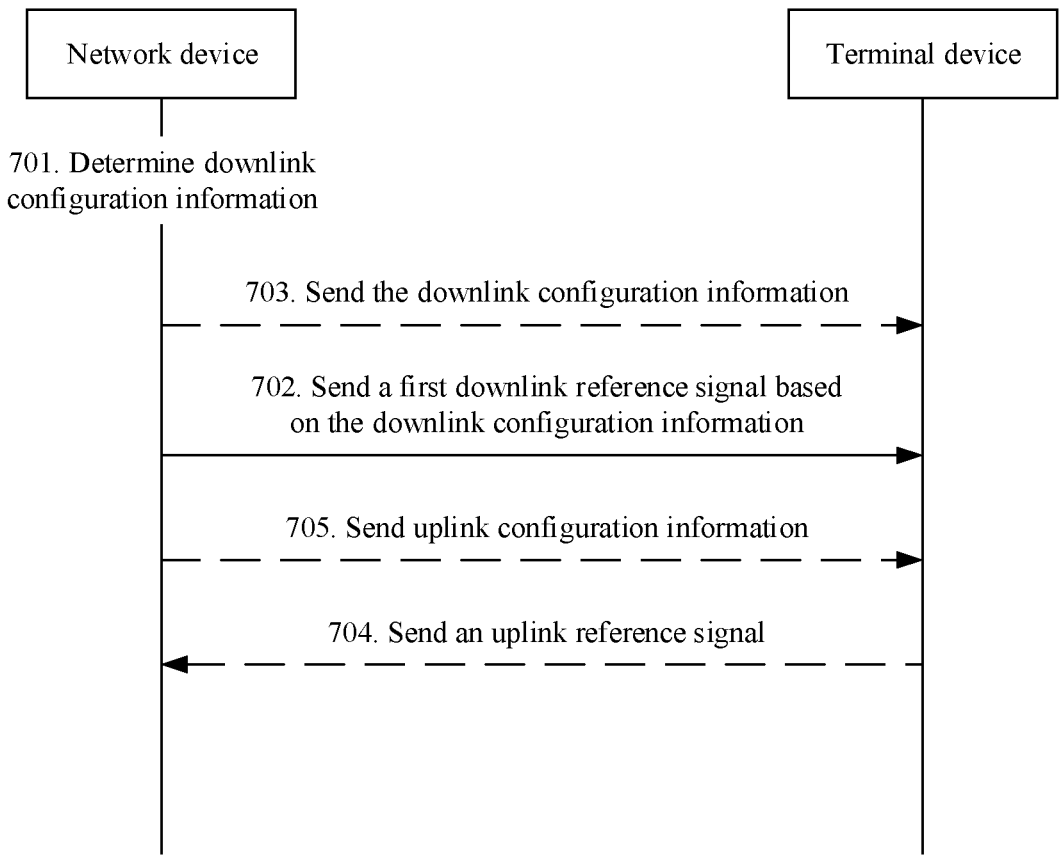
FIG. 7 is a schematic flowchart of a second communication method according to an embodiment.

The configurable ranges of the first symbol and the second symbol are designed to be two slots, so that more terminal devices can be supported through an uplink reference signal configuration. As shown in FIG. 7, the following describes a second communication method according to an embodiment of this application.

S701. A network device determines downlink configuration information.

S702. The network device sends a first downlink reference signal to a terminal device based on the downlink configuration information, and the terminal device receives the first downlink reference signal from the network device.

Optionally, after S701 and before S702, the method further includes S703.

S703. The network device sends downlink configuration information to the terminal device.

When receiving the first downlink reference signal, the terminal device may determine, based on the downlink configuration information, a resource location at which the first downlink reference signal is received.

Optional implementations of the embodiment in FIG. 7 are described in detail below.

Optionally, after S702, the method further includes S704.

S704. The terminal device sends an uplink reference signal to the network device. The network device receives the uplink reference signal from the terminal device.

For this step, refer to S402.

Optionally, before S704, the method further includes S705.

S705. The network device sends uplink configuration information to the terminal device, and the terminal device receives the uplink configuration information from the network device.

For this step, refer to S401.

An execution sequence of S705 and S701 to S703 is not limited. In the figure, that S705 is performed after S702 is used as an example.

The first downlink reference signal may be a TRS, a DMRS, or a combination thereof.

The downlink configuration information is for configuring the first downlink reference signal. The downlink configuration information includes one or more of the following configurations of the first downlink reference signal:

(1) An interval between two adjacent time units occupied by the first downlink reference signal in one slot is less than four symbols.

(2) An interval between any two frequency domain units occupied by the first downlink reference signal in frequency domain is greater than four subcarriers.

Figure 8A:
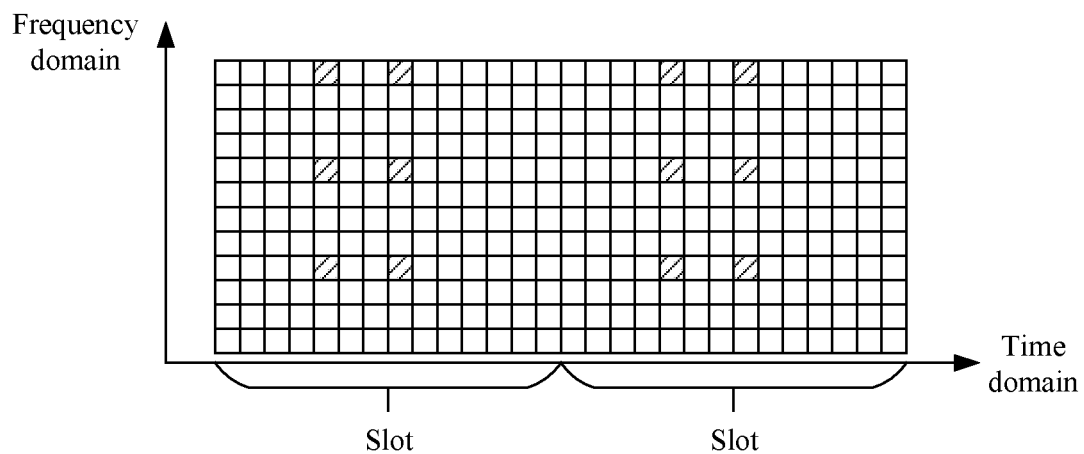
FIG. 8a is a first schematic diagram of a time domain configuration manner of a downlink reference signal resource according to an embodiment.
Figure 8B:
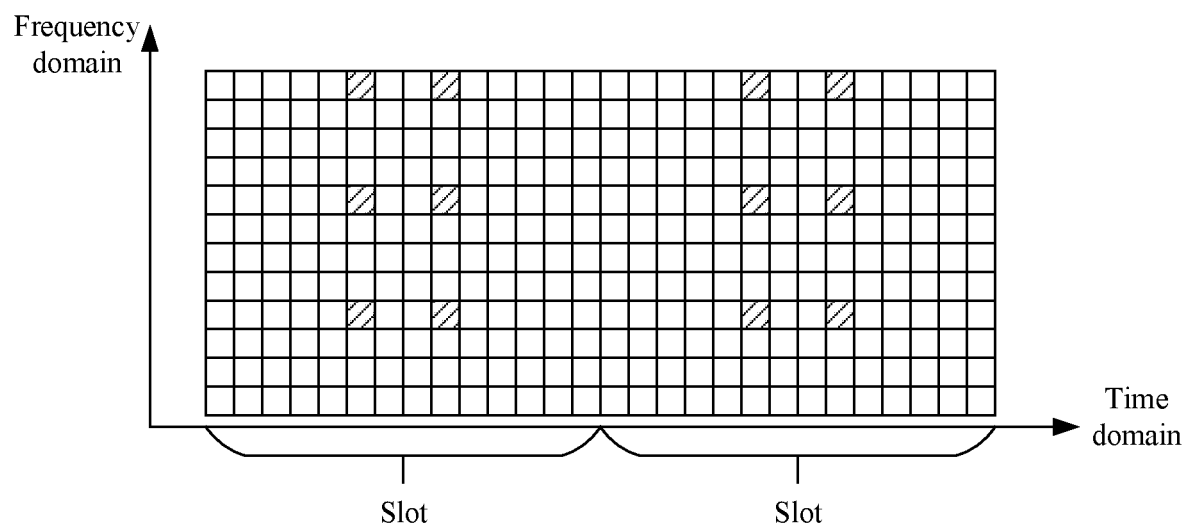
FIG. 8b is a second schematic diagram of a time domain configuration manner of a downlink reference signal resource according to an embodiment.
Figure 8C:
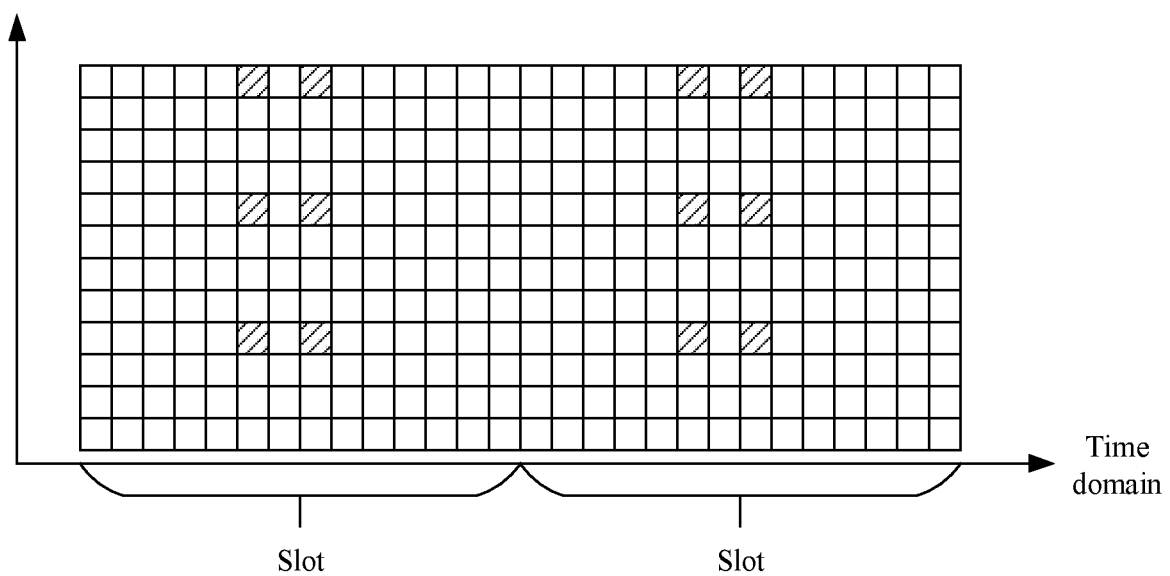
FIG. 8c is a third schematic diagram of a time domain configuration manner of a downlink reference signal resource according to an embodiment.

For example, the first downlink reference signal is a TRS. When the configuration in item (1) is met:

The first downlink reference signal occupies a plurality of time units of one slot in time domain, and occupies a plurality of frequency domain units in frequency domain. One time unit and one frequency domain unit form one time-frequency unit. In FIG. 8a, FIG. 8b, and FIG. 8c, a small shadow block is a time-frequency unit of the first downlink reference signal. An interval between two adjacent units in time domain occupied by the first downlink reference signal in each slot may be three symbols, and symbols in one slot are numbered from 0. As shown in FIG. 8a, the first downlink reference signal is located on the fifth symbol and the eighth symbol in each slot. Alternatively, as shown in FIG. 8b, the first downlink reference signal is located on the sixth symbol and the ninth symbol in each slot. An interval between adjacent units in two time domains occupied by the first downlink reference signal each slot may be two symbols. As shown in FIG. 8c, the first downlink reference signal is located on the sixth symbol and the eighth symbol in each slot.

In FIG. 8a to FIG. 8c, an example in which an interval between any two units in frequency domain is four subcarriers is used for illustration.

Figure 8D:
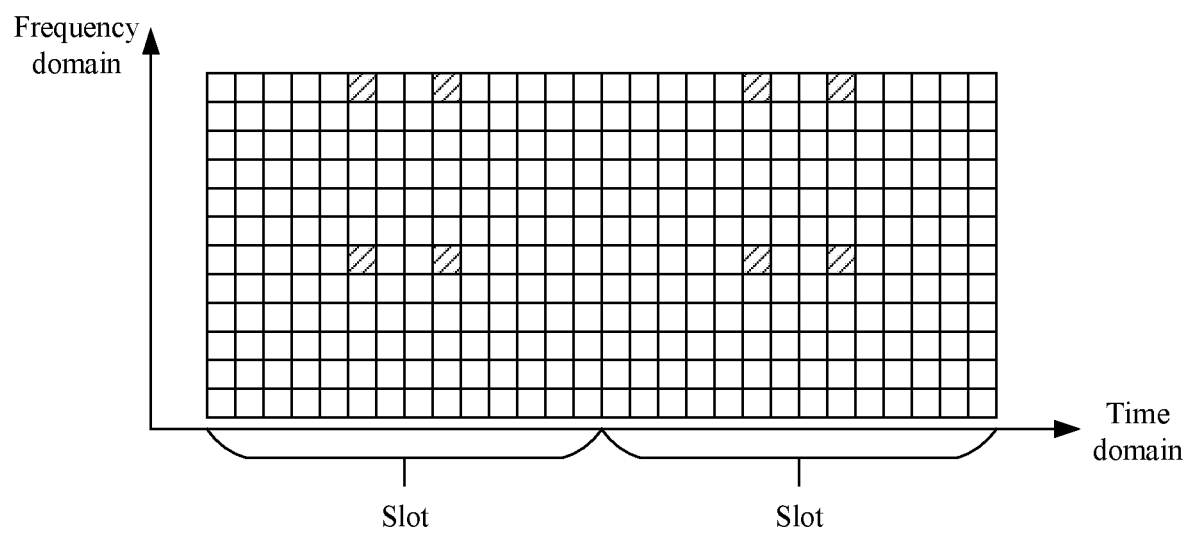
FIG. 8d is a fourth schematic diagram of a time domain configuration manner of a downlink reference signal resource according to an embodiment.

When the configuration in item (2) is met, an interval between any two units occupied by the first downlink reference signal in frequency domain is greater than four subcarriers, and an interval between two adjacent units occupied by the first downlink reference signal in one slot may not be limited, or may be set based on item (1). For example, an interval between two adjacent units occupied by the first downlink reference signal in frequency domain is six subcarriers. If a resource bandwidth of the first downlink reference signal is 12 RBs, a frequency domain density of the first downlink signal is 2. As shown in FIG. 8d, an interval between two adjacent units occupied by the first downlink reference signal in frequency domain is six subcarriers, and an interval between two adjacent units occupied by the first downlink reference signal in one slot is three symbols.

It may be understood that the foregoing item (1) and item (2) may be set independently, or may be set together.

Optionally, a maximum value of the resource bandwidth of the first downlink reference signal may be configured. For example, the maximum value is 16 RBs.

Figure 9:
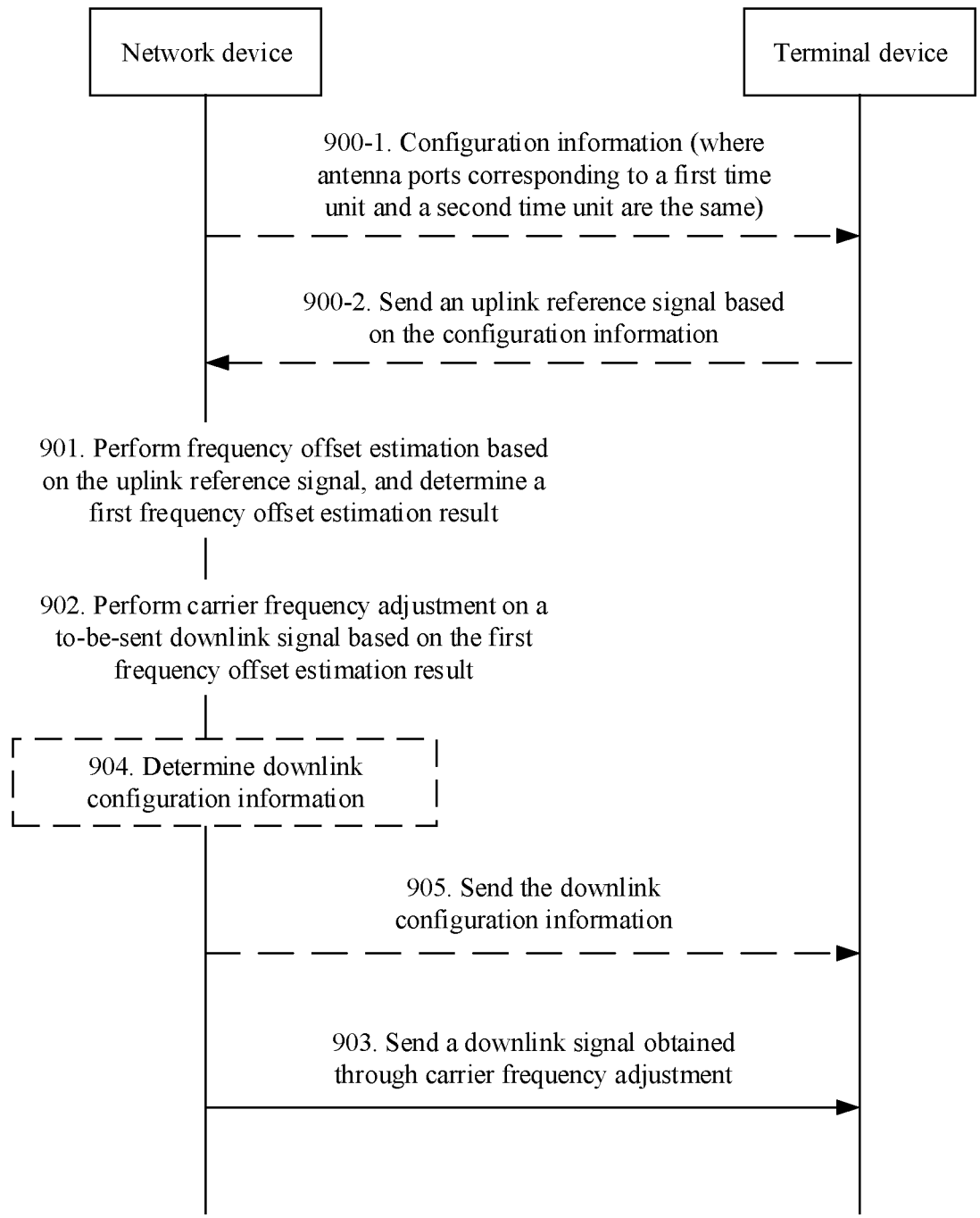
FIG. 9 is a schematic flowchart of a third communication method according to an embodiment.

As shown in FIG. 9, the following describes a third communication method according to an embodiment of this application.

S901. A network device performs frequency offset estimation based on an uplink reference signal, and determines a frequency offset estimation result.

S902. The network device performs carrier frequency adjustment on a to-be-sent downlink signal based on the frequency offset estimation result.

S903. The network device sends a downlink signal obtained through carrier frequency adjustment to a terminal device.

Optionally, before S901, the method further includes S900-1 and S900-2.

S900-1. The network device sends uplink configuration information to the terminal device, and the terminal device receives the uplink configuration information from the network device.

For this step, refer to S401.

S900-2. The terminal device sends the uplink reference signal to the network device based on the uplink configuration information. The network device receives the uplink reference signal from the terminal device.

For this step, refer to S402.

For a same step, refer to the foregoing description of the embodiment in FIG. 4. Details are not described herein again.

When S900-1 and S900-2 are included, the embodiment in FIG. 9 may be combined with the embodiment in FIG. 4 to form a protection solution of this application.

In some application scenarios, a frequency offset is large. For example, in a high-speed movement scenario, a Doppler shift is a main component of a frequency offset, and the Doppler shift is relatively large. If the method in FIG. 2a or FIG. 2b is used, there is a residual frequency offset during frequency offset tracking or measurement performed by the terminal device, and an effect of correcting the frequency offset is poor. In a case that the effect of correcting a frequency offset is relatively poor, inter-subcarrier interference is increased, reception performance of a receive end is reduced, and a system throughput is reduced. Based on the method shown in FIG. 9, the network device can perform carrier frequency adjustment before sending a downlink signal, which is equivalent to performing frequency offset pre-correction on the downlink signal. In this way, the downlink signal received by the terminal device may be a signal with a frequency offset of 0 or a very small frequency offset, and the terminal device does not need to perform frequency offset correction. Frequency offset correction is performed at a transmit end instead of the receive end. This improves frequency offset correction performance when the frequency offset is relatively large.

The downlink signal in the embodiment in FIG. 9 may be a downlink reference signal, or may be downlink data. The downlink reference signal may be a TRS, a DMRS, or a combination thereof. The downlink data may be a signal carried on a downlink shared channel, for example, a signal carried on a physical downlink shared channel (PDSCH). Alternatively, the downlink signal may be a message 2 sent by the network device to the terminal device in an initial access procedure or a cell handover procedure. The message 2 is a random access response (RAR).

Optionally, if the downlink signal is a downlink reference signal, the embodiment in FIG. 9 may also be combined with the embodiment in FIG. 7 to form a protection solution of this application.

In this case, before S903, S904 may be further performed.

S904 is the same as S701. An execution sequence of S904 and S901 and S902 are not limited.

Refer to the description of S702. S903 in which the network device sends a downlink signal obtained through carrier frequency adjustment to a terminal device may be specifically implemented as follows: The network device sends, based on downlink configuration information, the downlink signal obtained through carrier frequency adjustment to the terminal device.

Step S905 may be performed after S904 and before S903. S905 is the same as S703.

It may be understood that the embodiment in FIG. 9 may be used in combination with the method in FIG. 4, or may be used in combination with the method in FIG. 7, or may be used in combination with the two methods in FIG. 4 and FIG. 7.

Figure 10:
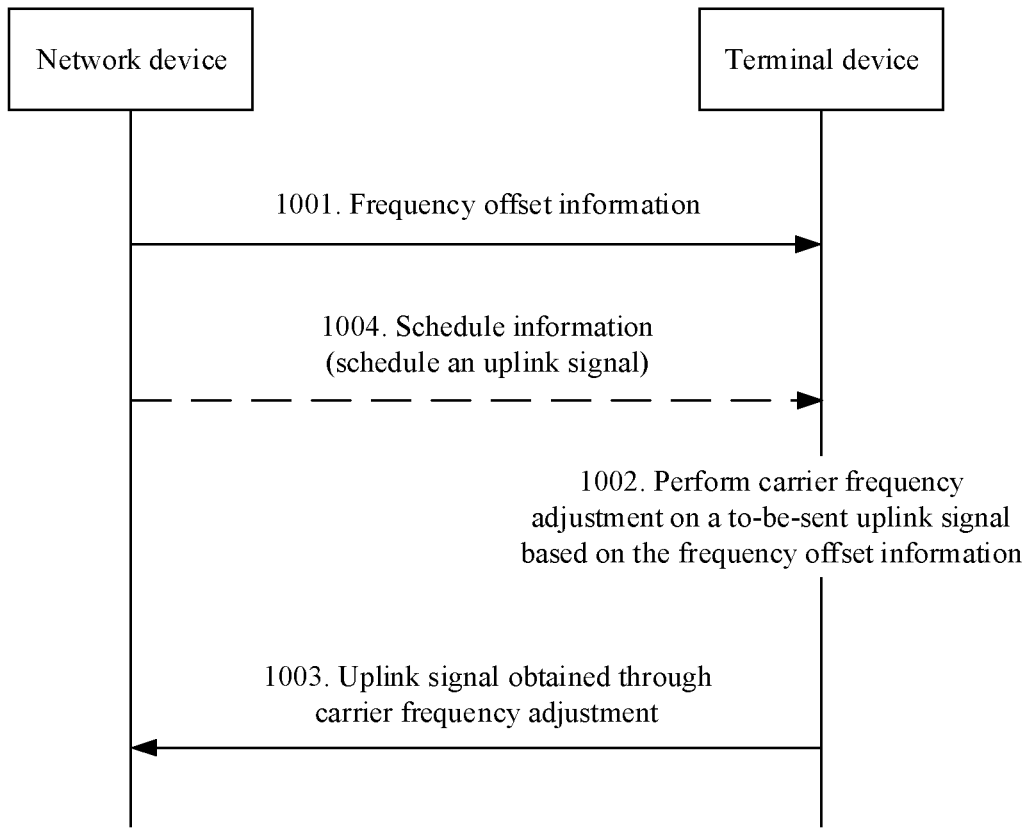
FIG. 10 is a schematic flowchart of a fourth communication method according to an embodiment.

As shown in FIG. 10, the following describes a fourth communication method according to an embodiment of this application.

S1001. A network device sends frequency offset information to a terminal device, and the terminal device receives the frequency offset information from the network device.

S1002. The terminal device performs carrier frequency adjustment on a to-be-sent uplink signal based on the frequency offset information.

S1003. The terminal device sends an uplink signal obtained through carrier frequency adjustment to the network device, and the network device receives the uplink signal from the terminal device.

In some application scenarios, a frequency offset is large. For example, in a high-speed movement scenario, a Doppler shift is a main component of a frequency offset, and the Doppler shift is relatively large. If the method in FIG. 2a or FIG. 2b is used, there is a residual frequency offset when the network device estimates the frequency offset, and an effect of correcting the frequency offset is poor. In a case that an effect of correcting a frequency offset is relatively poor, inter-subcarrier interference is increased, reception performance of a receive end is reduced, and a system throughput is reduced. Based on the method shown in FIG. 10, the terminal device can perform carrier frequency adjustment before sending the uplink signal, which is equivalent to performing frequency offset pre-correction on the uplink signal. In this way, the uplink signal received by the network device may be a signal with a frequency offset of 0 or a very small frequency offset, and the network device does not need to perform frequency offset correction. Frequency offset correction is performed at a transmit end instead of the receive end. This improves frequency offset correction performance when the frequency offset is large.

Optionally, before S1002, the method further includes S1004.

S1004. The network device sends scheduling information to the terminal device, and the terminal device receives the scheduling information from the network device.

The scheduling information is used to schedule the terminal device to send an uplink signal. The scheduling information may include information about a resource used to send an uplink signal.

The uplink signal may be an uplink reference signal, or may be uplink data. The uplink reference signal may be any one or more of an SRS, a DMRS, or a PT-RS. The uplink data may be data carried on a physical uplink shared channel (PUSCH). Alternatively, the uplink signal may be a preamble sent by the terminal device in an initial access procedure or a cell handover procedure.

Optionally, the frequency offset information may be carried in RRC signaling, a MAC CE, or DCI.

In a possible design, step S1001 may be replaced with the following manner for implementation:

The network device sends two downlink reference signals to the terminal device, where one downlink reference signal may be a signal obtained through carrier frequency adjustment according to the embodiment in FIG. 9, and the other downlink reference signal is a signal on which no carrier frequency adjustment is performed, so that the terminal device may determine frequency offset information based on the two received downlink reference signals.

In the embodiment in FIG. 9 or FIG. 10, it may be considered that the transmit end performs frequency offset pre-correction on the to-be-sent signal. For example, the network device performs carrier frequency adjustment on the to-be-sent downlink signal, and sends an adjusted downlink signal. In another example, the terminal device performs carrier frequency adjustment on the to-be-sent uplink signal, and sends an adjusted uplink signal. In this way, a signal received by the receive end has no frequency offset or has a very small frequency offset. Optionally, after receiving the signal obtained through carrier frequency adjustment, the receive end may further perform frequency offset estimation and compensation, which can further improve the effect of frequency offset adjustment.

With reference to the embodiment in FIG. 9 or FIG. 10, the following describes a possible implementation process of performing frequency offset pre-correction at the transmit end.

The transmit end may be a network device or a terminal device.

The transmit end obtains frequency offset information. If the transmit end is a network device, the network device obtains a frequency offset estimation result, and determines the frequency offset information based on the frequency offset estimation result. If the transmit end is a terminal device, the terminal device receives the frequency offset information from the network device.

The transmit end performs carrier frequency adjustment on a to-be-sent signal. The carrier frequency adjustment may include adjustment in frequency domain, or adjustment in time domain, or adjustment in time domain and frequency domain. For adjustment infrequency domain, the frequency offset information may be a convolutional polynomial coefficient. For adjustment in time domain, the frequency offset information may be a filtering coefficient.

The network device may determine, based on the frequency offset information, whether to perform frequency offset pre-correction. For example, the network device compares the frequency offset estimation result with a specified threshold, and determines, based on a comparison result, whether to perform frequency offset adjustment. The specified threshold may be, for example, 500 Hz.

Optionally, if the frequency offset estimation result is greater than the specified threshold, it is determined that frequency offset adjustment needs to be performed; otherwise, frequency offset adjustment does not need to be performed, and a signal without frequency offset adjustment is sent.

Alternatively, if the frequency offset estimation result is always greater than the specified threshold in a period of time, it is determined that frequency offset adjustment needs to be performed; otherwise, frequency offset adjustment does not need to be performed, and a signal without frequency offset adjustment is sent. For example, the period of time may be 20 s.

Alternatively, if the frequency offset estimation result is greater than the specified threshold, it is determined that frequency offset adjustment needs to be performed. If the frequency offset estimation result is always not greater than the specified threshold in a period of time, frequency offset adjustment does not need to be performed, and a signal without frequency offset adjustment is sent. For example, the period of time may be 20 s.

Figure 11:
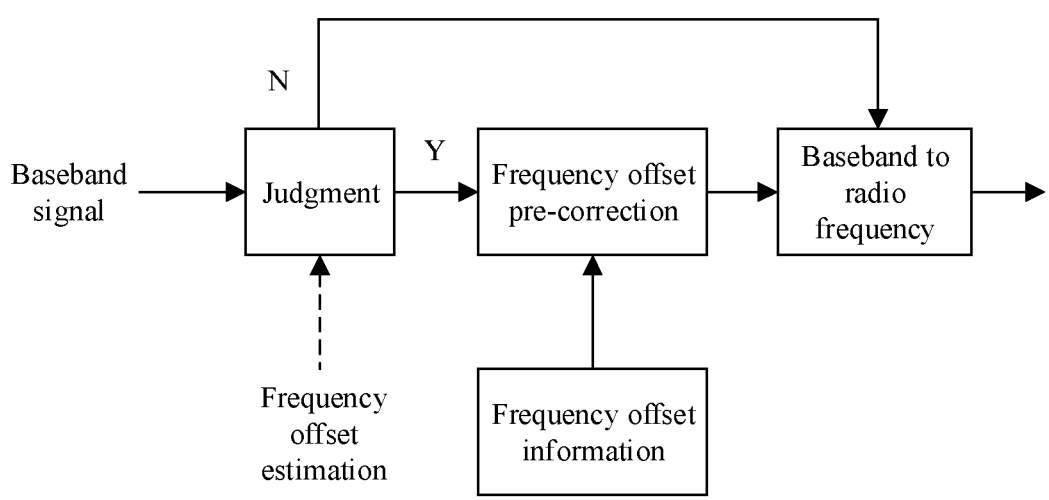
FIG. 11 is a schematic diagram of a frequency offset adjustment process according to an embodiment.

As shown in FIG. 11, the network device performs frequency offset pre-correction, that is, the network device performs carrier frequency adjustment on a to-be-sent downlink signal. The carrier frequency adjustment performed by the network device on the to-be-sent signal may be that the transmit end performs carrier frequency adjustment on a baseband signal. The baseband signal includes a data signal and/or a reference signal. Whether frequency offset adjustment needs to be performed is determined based on the frequency offset estimation result. If frequency offset adjustment needs to be performed, frequency offset adjustment is performed based on the frequency offset information; otherwise, the baseband signal is directly converted as a radio frequency signal for sending. For a process of determining whether frequency offset adjustment needs to be performed, refer to the foregoing "a possible implementation process of performing frequency offset pre-correction at the transmit end". The network device converts the baseband signal obtained through carrier frequency adjustment into a radio frequency signal for sending.

The solutions in which the transmit end performs frequency offset pre-correction are respectively described above from perspectives of the terminal device, the network device, and interaction between the network device and the terminal device. The terminal device may be any terminal device within a coverage range of the network device.

In the solution in which the network device performs carrier frequency adjustment (or frequency offset pre-correction) on the downlink signal, the network device may further perform frequency offset estimation on uplink reference signals sent by a plurality of terminal devices, to determine a frequency offset estimation result of each terminal device. In a case of obtaining frequency offset estimation results of a plurality of terminals, the network device may perform carrier frequency adjustment on downlink signals using different granularities.

In a possible implementation, the network device performs carrier frequency adjustment on all terminal devices in a cell using a same frequency offset value (for example, fd0).

In this case, the network device may select any one of the obtained frequency offset estimation results of the plurality of terminal devices in the cell to determine the frequency offset value, or determine an average value of a plurality of frequency offset estimation results as the frequency offset value.

In another possible implementation, the network device performs carrier frequency adjustment on terminal devices in a same group using a same frequency offset value. In this case, the terminal devices in a cell may be first grouped for the network device. Terminal devices with similar frequency offset estimation results may be grouped into a same group based on frequency offset estimation results corresponding to the terminal devices. A frequency offset value is determined for each group. For example, a frequency offset value of a group may be a frequency offset estimation result corresponding to any terminal device in the group, or an average value of a plurality of frequency offset estimation results in the group.

For example, the terminal devices may be divided into nine groups for the network device based on frequency offset values. Frequency offset values in a first group are less than −900 Hz. Frequency offset values in a second group are from −900 Hz to −700 Hz. Frequency offset values in a third group are from −700 Hz to −500 Hz. Frequency offset values in a fourth group are from −500 Hz to −300 Hz. Frequency offset values in a fifth group are from −300 Hz to 300 Hz. Frequency offset values in a sixth group are from 300 Hz to 500 Hz. Frequency offset values in a seventh group are from 500 Hz to 700 Hz. Frequency offset values in an eighth group are from 700 Hz to 900 Hz. Frequency offset values in a ninth group are greater than 900 Hz. In the first group, frequency offset pre-correction is performed based on $fd1=-900$ Hz. In the second group, frequency offset pre-correction is performed based on $fd2=-800$ Hz. In the third group, frequency offset pre-correction is performed based on $fd3=-600$ Hz. In the fourth group, frequency offset pre-correction is performed based on $fd4=-400$ Hz. In the fifth group, frequency offset pre-correction is performed based on $fd5=0$ Hz. In the sixth group, frequency offset pre-correction is performed based on $fd6=400$ Hz. In the seventh group, frequency offset pre-correction is performed based on $fd7=600$ Hz. In the eighth group, frequency offset pre-correction is performed based on $fd8=800$ Hz. In the ninth group, frequency offset pre-correction is performed based on $fd9=900$ Hz.

In another possible implementation, the network device performs carrier frequency adjustment on each terminal device using a frequency offset value corresponding to each terminal device. The network device performs, based on the manner in the embodiment in FIG. 9, frequency offset estimation on the uplink reference signal sent by the terminal device; determines a frequency offset estimation result; and performs, based on the frequency offset estimation result, carrier frequency adjustment on a downlink signal to be sent to the terminal device. It may be considered that this implementation uses a terminal device as a granularity. For example, the network device estimates that frequency offset values of UE1, UE2, . . . , and UEn are respectively fd1, fd2, . . . , and fdn, and then performs frequency offset pre-correction on each UE based on a corresponding frequency offset value.

In actual application, the network device may further perform frequency offset estimation based on an uplink reference signal sent by a first terminal device, to obtain a first frequency offset estimation result; and the network device may perform, based on the first frequency offset estimation result, carrier frequency adjustment on a downlink signal to be sent to a second terminal device. In this way, when the second terminal device does not send an uplink reference signal for frequency offset measurement, or the second terminal device does not have a capability of sending an uplink reference signal for frequency offset measurement, the network device may also perform frequency offset pre-correction on a downlink signal sent by the second terminal device. There may be an association relationship between the first terminal device and the second terminal device, for example, the first terminal device is close to or adjacent to the second terminal device.

Similarly, for the solution in which the terminal device performs frequency offset pre-correction on the uplink signal, the network device may send frequency offset information to the terminal device at a cell granularity, a group granularity, or a terminal device granularity. The terminal device performs carrier frequency adjustment on the uplink signal based on the frequency offset information. For a specific manner, refer to the foregoing solution in which the network device performs frequency offset pre-correction on the downlink signal. Details are not described herein again.

Optionally, when the solution in which frequency offset pre-correction is performed based on the group granularity or the cell granularity is used, overheads can be reduced, but an effect of frequency offset adjustment may be less accurate. In this case, after receiving a signal obtained through frequency offset pre-correction, the receive end may further perform frequency offset estimation based on a reference signal to compensate for a residual frequency offset. This can improve precision of frequency offset adjustment. For example, the terminal device receives a TRS and a DMRS from the network device. The TRS and the DMRS are pre-corrected by the network device based on the cell granularity or the group granularity, and there is a residual frequency offset on the downlink data signal, the TRS, and the DMRS that are received by the terminal device. The terminal device may obtain residual frequency offset estimation based on the received DMRS or an additional DMRS, to further compensate for the residual frequency offset on the received signal on which frequency offset pre-correction is performed.

It should be noted that in embodiments of this application, any two or more embodiments (or possible designs) may be combined to form a solution that needs to be protected in this application. When two embodiments are used in combination, for methods or designs described in the embodiments, mutual reference may be made to each other.

It should be noted that examples in the application scenarios in this application merely show some possible implementations, to help better understand and describe the method in this application. Persons skilled in the art may obtain examples of some evolved forms according to the reference signal indication method provided in this application.

In the embodiments provided in this application, the methods provided in embodiments of this application are described from perspectives of the terminal device, the network device, and interaction between the network device and the terminal device. To implement functions in the method provided in the foregoing embodiments of this application, the network device and the terminal may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 12:
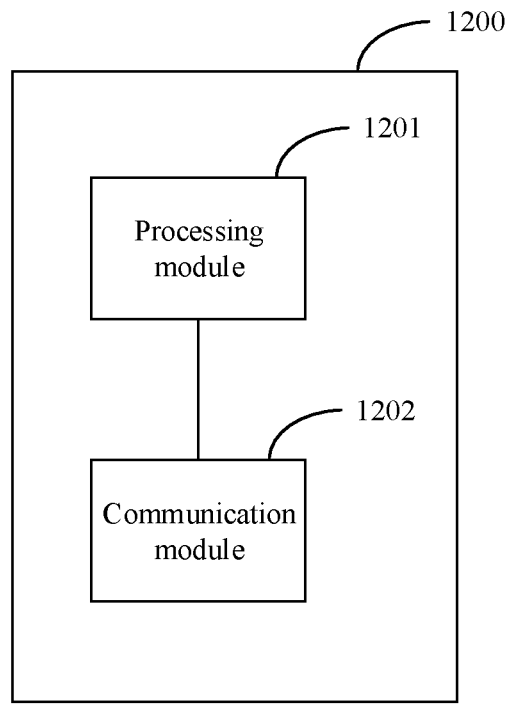
FIG. 12 is a first schematic diagram of a structure of a communication apparatus according to an embodiment.

As shown in FIG. 12, based on a same technical concept, an embodiment of this application further provides a communication apparatus 1200. The communication apparatus 1200 may be a terminal device or a network device, an apparatus in a terminal device or a network device, or an apparatus that can be used together with a terminal device or a network device. In a design, the communication apparatus 1200 may include modules for performing the methods/operations/steps/actions performed by the terminal device or the network device in the foregoing method embodiments. The modules may be hardware circuits, may be software, or may be implemented by using the hardware circuits in combination with the software. In a design, the communication apparatus may include a processing module 1201 and a communication module 1202. The processing module 1201 is configured to invoke the communication module 1202 to perform a receiving and/or sending function.

When the communication apparatus is configured to perform the method performed by the terminal device:

the communication module 1202 is configured to receive configuration information from a network device, where the configuration information is for configuring one or more uplink reference signal resources, the one or more uplink reference signal resources include a first time unit and a second time unit, and a first antenna port corresponding to the first time unit is the same as a second antenna port corresponding to the second time unit; and the communication module 1202 is further configured to send an uplink reference signal to the network device based on the configuration information.

The processing module 1201 and the communication module 1202 may be further configured to perform another corresponding step or operation performed by the terminal device in the foregoing method embodiments. Details are not described herein again.

For example, when the communication apparatus is configured to perform the method performed by the network device:

the communication module 1202 is configured to send configuration information to a terminal device, where the configuration information is for configuring one or more uplink reference signal resources, the one or more uplink reference signal resources include a first time unit and a second time unit, and a first antenna port corresponding to the first time unit is the same as a second antenna port corresponding to the second time unit; and the communication module 1202 is further configured to receive an uplink reference signal from the terminal device.

Alternatively, when the communication apparatus is configured to perform the method performed by the network device:

the processing module 1201 is configured to determine downlink configuration information, where the downlink configuration information is for configuring a downlink reference signal resource, and the downlink reference signal meets one or more of the following configurations: an interval between two adjacent time units occupied by the downlink reference signal in one slot is less than four symbols, or an interval between any two frequency domain units occupied by the downlink reference signal in frequency domain is greater than four subcarriers; and the communication module 1202 is configured to send the downlink configuration information to a terminal device.

The processing module 1201 and the communication module 1202 may be further configured to perform another corresponding step or operation performed by the network device in the foregoing method embodiments. Details are not described herein again.

Division into modules in embodiments of this application is an example, and is merely logical function division. During actual implementation, there may be another division manner. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 13:
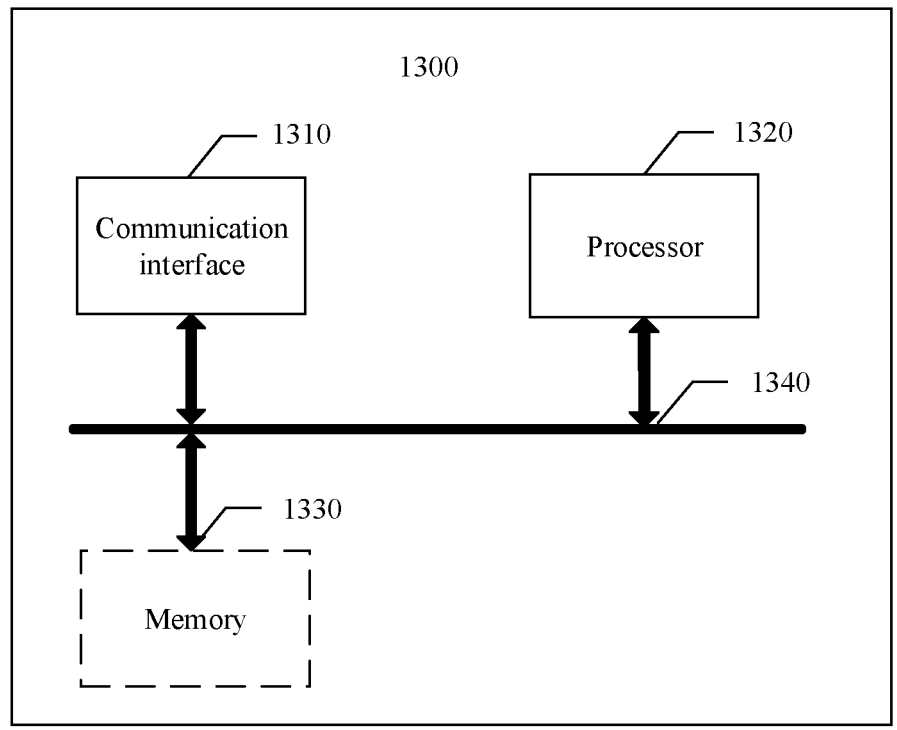
FIG. 13 is a second schematic diagram of a structure of a communication apparatus according to an embodiment.

FIG. 13 shows a communication apparatus 1300 according to an embodiment of this application. The communication apparatus 1300 is configured to implement functions of the terminal device or the network device in the foregoing method. When implementing functions of the network device, the apparatus may be the network device, may be an apparatus in the network device, or an apparatus that can be used together with the network device. When implementing functions of the terminal device, the apparatus may be the terminal device, an apparatus in the terminal device, or an apparatus that can be used together with the terminal device. The apparatus may be a chip system. In this embodiment of this application, the chip system may include a chip, or may include the chip and another discrete component. The communication apparatus 1300 includes at least one processor 1320, configured to implement functions of the terminal device or the network device in the method provided in embodiments of this application. The communication apparatus 1300 may further include a communication interface 1310. In this embodiment of this application, the communication interface may be a transceiver, a circuit, a bus, a module, or a communication interface of another type, and is configured to communicate with another device through a transmission medium. For example, the communication interface 1310 is used by an apparatus in the apparatus 1300 to communicate with another (second) device. For example, when the communication apparatus 1300 is a network device, the another (second) device may be a terminal device. When the communication apparatus 1300 is a terminal device, the another (second) apparatus may be a network device. The processor 1320 receives and sends data through the communication interface 1310, and is configured to implement the methods described in the foregoing method embodiments. For example, when implementing functions of the network device, the processor 1320 is configured to determine downlink configuration information, where the downlink configuration information is for configuring a resource of a downlink reference signal, and the downlink reference signal meets one or more of the following configurations: an interval between two adjacent time units occupied by the downlink reference signal in one slot is less than four symbols, or an interval between any two frequency domain units occupied by the downlink reference signal in frequency domain is greater than four subcarriers; and send the downlink configuration information to a terminal device through the communication interface 1310.

When implementing functions of the terminal device, the processor 1320 is configured to receive configuration information from a network device through the communication interface 1310, where the configuration information is for configuring one or more uplink reference signal resources, the one or more uplink reference signal resources include a first time unit and a second time unit, and a first antenna port corresponding to the first time unit is the same as a second antenna port corresponding to the second time unit; and send an uplink reference signal to the network device based on the configuration information. The processor 1320 and the communication interface 1310 may further be configured to perform another corresponding steps or operation performed by the terminal device or the network device in the foregoing method embodiment. Details are not described herein again.

The apparatus 1300 may further include at least one memory 1330, configured to store program instructions and/or data. The memory 1330 is coupled to the processor 1320. The coupling in embodiments of this application is an indirect coupling or a communication connection between apparatuses, units, or modules in an electrical form, a mechanical form, or another form, and is used for information exchange between the apparatuses, the units, or the modules. The processor 1320 may operate in collaboration with the memory 1330. The processor 1320 may execute the program instructions stored in the memory 1330. At least one of the at least one memory may be included in the processor.

In embodiments of this disclosure, a specific connection medium between the communication interface 1310, the processor 1320, and the memory 1330 is not limited. In this embodiment of this application, in FIG. 13, the memory 1330, the processor 1320, and the communication interface 1310 are connected through a bus 1340. The bus is represented by a thick line in FIG. 13. A connection manner between other components is merely an example for description, and is not limited thereto. The bus may be classified as an address bus, a data bus, a control bus, and the like. For ease of representation, only one thick line is used to represent the bus in FIG. 13, but this does not mean that there is only one bus or only one type of bus.

When the communication apparatus 1200 and the communication apparatus 1300 are specifically chips or chip systems, the communication module 1202 and the communication interface 1310 may output or receive baseband signals. When the communication apparatus 1200 and the communication apparatus 1300 are specifically devices, the communication module 1202 and the communication interface 1310 may output or receive radio frequency signals. In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams of disclosed embodiments. The general-purpose processor may be a microprocessor, any conventional processor, or the like. The steps of the method disclosed with reference to this embodiment may be directly performed by a hardware processor, or may be performed by using a combination of hardware in the processor and a software module.

In this embodiment, the memory 1330 may be a nonvolatile memory, such as a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in embodiments of this disclosure may alternatively be a circuit or any other apparatus that can implement a storage function, and is configured to store program instructions and/or data.

Some or all of operations and functions performed by the terminal device or some or all of operations and functions performed by the node described in the foregoing method embodiments of this disclosure may be implemented by using a chip or an integrated circuit.

To implement the functions of the communication apparatus in FIG. 12 or FIG. 13, an embodiment further provides a chip, including a processor, configured to support the communication apparatus in implementing the functions of the terminal device or the node in the foregoing method embodiments. In a possible design, the chip is connected to a memory or the chip includes the memory, and the memory is configured to store program instructions and data that are necessary for the communication apparatus.

An embodiment of this disclosure provides a computer-readable storage medium that stores a computer program. The computer program includes instructions used to perform the foregoing method embodiments.

An embodiment of this disclosure provides a computer program product including instructions. When the computer program product runs on a computer, the computer is enabled to perform the foregoing method embodiments.

Persons skilled in the art should understand that disclosed embodiments may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer usable program code.

This specification is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although some preferred embodiments have been described, persons skilled in the art can make changes and modifications to these embodiments once they learn the basic inventive concept. Therefore, the appended claims are intended to be construed as to cover the preferred embodiments and all changes and modifications falling within the scope of this disclosure.

What is claimed is:

1. A communication method, comprising:
receiving configuration information from a network device, wherein the configuration information providing for configuring one or more uplink reference signal resources each comprising a first time unit and a second time unit, the first time unit including a first antenna port and the second time unit including a second antenna port, the first antenna port being the same as the second antenna port;
receiving a first downlink reference signal from the network device, the first downlink reference signal meeting at least one of the following configurations: an interval between two adjacent time units occupied by the first downlink reference signal in one slot is less than four symbols, or an interval between any two frequency domain units occupied by the first downlink reference signal in the frequency domain is greater than four subcarriers; and
sending an uplink reference signal to the network device based on the configuration information.

2. The method according to claim 1, wherein a quantity of uplink reference signal ports corresponding to the first time unit is different from a quantity of uplink reference signal ports corresponding to the second time unit.

3. The method according to claim 1, wherein an uplink reference signal port number corresponding to the first time unit is the same as an uplink reference signal port number corresponding to the second time unit.

4. The method according to claim 1, wherein the first antenna port is associated with at least one uplink reference signal port corresponding to the first time unit, and the second antenna port is associated with at least one uplink reference signal port corresponding to the second time unit.

5. The method according to claim 1, the method further comprising:
obtaining a downlink carrier frequency based on the first downlink reference signal, the downlink carrier frequency being used as a carrier reference for sending the uplink reference signal.

6. A terminal device, comprising:
a processor; and
a memory coupled to the processor, the memory comprising instructions that, when executed by the processor, cause the terminal device to perform operations comprising:
receiving configuration information from a network device, the configuration information providing for configuring one or more uplink reference signal resources each comprising a first time unit and a second time unit, the first time unit including a first antenna port and the second time unit including a second antenna port, the first antenna port being the same as the second antenna port;
receiving a first downlink reference signal from the network device, the first downlink reference signal meeting at least one of the following configurations: an interval between two adjacent time units occupied by the first downlink reference signal in one slot is less than four symbols, or an interval between any two frequency domain units occupied by the first downlink reference signal in the frequency domain is greater than four subcarriers; and
sending an uplink reference signal to the network device based on the configuration information.

7. The terminal device according to claim 6, wherein the first time unit and the second time unit are two symbols in two adjacent slots.

8. The terminal device according to claim 6, wherein a quantity of uplink reference signal ports corresponding to the first time unit is different from a quantity of uplink reference signal ports corresponding to the second time unit.

9. The terminal device according to claim 6, wherein an uplink reference signal port number corresponding to the first time unit is the same as an uplink reference signal port number corresponding to the second time unit.

10. The terminal device according to claim 6, wherein the first antenna port is associated with at least one uplink reference signal port corresponding to the first time unit, and the second antenna port is associated with at least one uplink reference signal port corresponding to the second time unit.

11. The terminal device according to claim 6, wherein the first time unit and second time unit are any two non-adjacent symbols in a first slot.

12. The terminal device according to claim 6, wherein a function of the one or more uplink reference signal resources is configured for frequency offset measurement or configured for a codebook-based uplink transmission mode.

13. The terminal device according to claim 6, wherein the operations further comprise:
receiving a second downlink reference signal from the network device; and
performing frequency offset compensation based on frequency offset estimation based on the second downlink reference signal; and
performing carrier frequency estimation obtained based on the first downlink reference signal.

14. The terminal device according to claim 13, wherein the second downlink reference signal is an additional demodulation reference signal.

15. The terminal device according to claim 6, the operations further comprising:
obtaining a downlink carrier frequency based on the first downlink reference signal, the downlink carrier frequency being used as a carrier reference for sending the uplink reference signal.

16. A network device, comprising:
a processor; and
a memory coupled to the processor, the memory comprising instructions that, when executed by the processor, cause the network device to perform operations comprising:
sending configuration information to a terminal device, the configuration information providing for configuring one or more uplink reference signal resources, the one or more uplink reference signal resources comprise a first time unit and a second time unit, the first time unit including a first antenna port and the second time unit including a second antenna port, the first antenna port being the same as the second antenna port;
sending a first downlink reference signal to the terminal device, the first downlink reference signal meeting at least one of the following configurations: an interval between two adjacent time units occupied by the first downlink reference signal in one slot is less than four symbols, or an interval between any two frequency domain units occupied by the first downlink reference signal in the frequency domain is greater than four subcarriers; and
receiving an uplink reference signal from the terminal device.

17. The network device according to claim 16, wherein a quantity of uplink reference signal ports corresponding to the first time unit is different from a quantity of uplink reference signal ports corresponding to the second time unit.

18. The network device according to claim 16, wherein an uplink reference signal port number corresponding to the first time unit is the same as an uplink reference signal port number corresponding to the second time unit.

19. The network device according to claim 16, wherein the first antenna port is associated with at least one uplink reference signal port corresponding to the first time unit, and the second antenna port is associated with at least one uplink reference signal port corresponding to the second time unit.

20. The network device according to claim 16, wherein the first downlink reference signal is used for determining a carrier reference for the uplink reference signal.

\* \* \* \* \*